United States Patent [19]

Takemura et al.

[11] Patent Number: 5,013,818
[45] Date of Patent: May 7, 1991

[54] MODIFIED POLYARYLATE RESIN AND COMPOSITION COMPRISING THE SAME

[75] Inventors: Kazuya Takemura; Kenji Yoshino; Tadahiro Wakui, all of Chiba, Japan

[73] Assignee: Kawasaki Steel Corporation, Hyogo, Japan

[21] Appl. No.: 449,595

[22] Filed: Dec. 12, 1989

[30] Foreign Application Priority Data

Dec. 15, 1988 [JP] Japan .................................. 63-317109

[51] Int. Cl.⁵ ............................................ C08G 63/02
[52] U.S. Cl. ................................... 528/193; 525/423; 525/425; 525/438; 528/176; 528/194
[58] Field of Search ...................... 525/423, 425, 438; 528/176, 193, 194

[56] References Cited

FOREIGN PATENT DOCUMENTS 0143640 11/1983 European Pat. Off. .

Primary Examiner—Harold D. Anderson
Assistant Examiner—T. Mosley
Attorney, Agent, or Firm—Austin R. Miller

[57] ABSTRACT

An improved polyarylate resin is provided, which resin comprises the following units (I) to (IV)

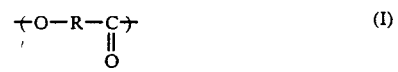

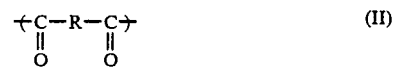

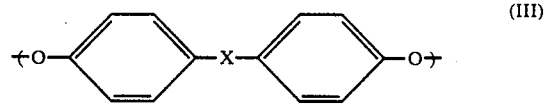

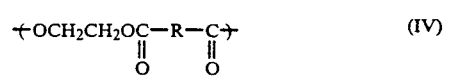

the units (I) being contained in an amount of from 3 to 30 mole %, the units (II) being contained in amount of not less than 30 mole %, the units (III) being contained in an amount of not less than 30 mole %, and the units (IV) being contained in an amount of not larger than 25 mole %, each based on the total moles of the units (I) to (IV). The polyarylate resin has good mechanical strength, heat resistance, resistance to color change, transparency, moldability and flame retardancy. A resin composition comprising the polyarylate resin, a polyamide and an epoxy resin is also provided.

7 Claims, 5 Drawing Sheets

FIG. I

MODIFIED POLYARYLATE RESIN AND COMPOSITION COMPRISING THE SAME

BACKGROUND OF THE INVENTION

This invention relates to modified polyarylate resins which have good mechanical strength, resistance to color change, transparency, moldability and flame retardancy and also to compositions comprising the same.

Aromatic polyester copolymers prepared from aromatic dicarboxylic acids and bisphenols (hereinafter referred to simply as polyarylate resin or resins) and particularly, polyarylate resins prepared from terephthalic acid and/or isophthalic acid and 2,2-bis (4-hydroxyphenyl) propane (bisphenol A) have good mechanical strength, electric characteristics, flame retardancy, dimensional stability and transparency. The melt moldings of the copolymers have wide utility as various machine parts, films, fibers and the like.

The preparation of the polyarylate resin can be broadly classified into a melt polymerization process as disclosed in Japanese Patent Publication Nos. 38-15247, 38-26299 and 43-28119 and Ind. Eng. Chem., 51, 147 (1959), a solution polymerization process as disclosed in Japanese Patent Publication No. 37-5599, and an interfacial polymerization process as disclosed in Japanese Patent Publication Nos. 40-1959 and 38-3598.

Of these processes, the solution polymerization process has many drawbacks that expensive acid chlorides (derived from corresponding carboxylic acids by the use of reagents such as thionyl chloride) have to be used and solvents and acid acceptors are essential, requiring much labor for the recovery thereof and that washing and drying steps of the resultant polymer are necessary.

The interfacial polymerization process has, aside from the drawbacks involved in the solution polymerization process, the problem that additional labor is necessary for separation between aqueous and organic phases and the acid chloride may be hydrolyzed with water.

On the other hand, the melt polymerization process is free from those drawbacks involved in the solution polymerization process and the interfacial polymerization process, but has the following disadvantages.

Bisphenol A-based polyarylates comprised of bisphenol A, terephthalic acid and/or isophthalic acid do not exhibit satisfactory mechanical strength until the molecular weight reaches such a value that corresponds to an inherent viscosity of 0.40 dl/g or over. However, the viscosity of the product having such a molecular weight as mentioned above becomes as high as several thousands to several ten thousands poises at high as several thousands to several ten thousands poises at high temperatures, for example, of 350° C. or higher, with a loss of properties as a fluid. This will make the agitation of the system difficult, thereby causing the organic acid or phenols produced by the ester interchange reaction not to be removed to a satisfactory extent. Polymers with a high degree of polymerization are difficult to obtain. In addition, the polymer is in contact with hot wall surfaces of a polymerization reactor over a long time and will undergo coloration or decomposition by local overheating.

Accordingly, it is substantially difficult to obtain, according to the melt polymerization process, bisphenol A-based polyarylates having good appearance and good mechanical strength. Industrially, they have been manufactured by the solution polymerization or interfacial polymerization process which is high in cost. However, if the above problems can be solved, the melt polymerization process is the most advantageous as an industrial process of preparing polyarylate resins.

In recent years, Japanese Laid-open Patent Application Nos. 48-88193 and 58-185615 proposed improved processes wherein thermoplastic polymers are added for preparing polyarylates by the melt polymerization process.

In the U.S. Pat. No(s). 3,684,766 and 4,075,173 have proposed processes wherein prepolymers are initially prepared according to the melt polymerization process and subjected to solid phase polymerization.

In the process, for example, disclosed in the Japanese Laid-open Patent Application 58-185615, the melting temperature and melt viscosity lower owing to the addition of thermoplastic polymer by which the difficulty in agitation at the time of polymerization and the problem accompanied by this can be solved. However, it takes a long time before the resultant polyarylate resin reaches a molecular weight sufficient to give satisfactory mechanical strength, during which the resin undergoes coloration. Accordingly, it is not possible to manufacture polyarylate resin having good mechanical strength and appearance.

The process disclosed in the U.S. Pat. No. 4,075,173 is a process wherein a prepolymer having a relatively small molecular weight is prepared in a low viscosity condition according to the melt polymerization process and is then heated in the form of the solid in an inert gas or under reduced pressure to cause the polymerization to proceed (solid phase polymerization process). This process needs an equipment for carrying out the solid polymerization, coupled with the problems of melt bonding of polymer and the non-uniformity in degree of polymerization. Thus, polyarylate resins of high quality cannot be obtained by this process.

Polyarylate resins which have a great demand in the fields of electric parts and automobile parts are also required to be in safety against fire. Various methods of imparting flame retardancy to polyarylate resins are known. In general, it has been widely used to incorporate in polyarylate resins a flame retardant such as an organic phosphorus compound or a halogen-containing compound with or without further addition of a flame retardant aid such as antimony trioxide. For the incorporation of the flame retardant in polyarylate resin, it is the most popular to subject polyarylate resins and flames retardants and/or aids thereof to melt kneading such as by extrusion (e.g. Japanese Laid-open Patent Application No. 60-155258, U.S. Pat. No. 4,259,458 and Japanese Laid-open Patent Application No. 53-94366).

However, since polyarylate resins have so high a melt viscosity that the melt kneading requires fairly high temperatures of, for example, 260° C. or over, the flame retardant is liable to thermally decompose or the thermal decomposition of the resin ascribed to the flame retardant aid is apt to occur at the time of the melt kneading, thereby causing the resultant molding to be colored or to be lowered in strength. Additionally, there may arise a problem that the molding machine is corroded by generation of corrosive gases.

In order to solve the above problems, it is known to use a polymer-type flame retardant having a tetrabromobisphenol A skelton such as, for example, a halogenated polycarbonate. The polyarylate molding wherein such a polymer-type flame retardant is added singly or in combination with a flame retardant aid such as antimony trioxide is free from the problems, such as the coloration of the resin caused by the thermal decomposition of the flame retardant and the generation of corrosive gases during the molding operation, since the flame retardant has good thermal stability.

However, the flame retardant has poor miscibility with the resin, thus bringing about a lowering of transparency and a lowering of physical properties of the molding caused by failure in dispersion.

On the other hand, it is also known that for flame retardancy of thermoplastic polyesters, halogen-containing aromatic diols are copolymerized by melt polymerization at the stage of the preparation thereby imparting flame retardancy thereto (for example, Japanese Laid-open Patent Application No. 55-123619). However, with polyarylates for which the reaction temperature of the melt polymerization is generally high at 320° C. or over, this method cannot solve the problems such as the coloration of the resin ascribed to the thermal decomposition of the halogen-containing aromatic diol and the corrosion of a polymerization apparatus produced by the generation of corrosive gases. In addition, because of the thermal decomposition, the degree of polymerization is difficult to increase. Accordingly, the resultant molding article suffers a substantial degree of coloration and has low mechanical strength.

For solving the above problem, a process is known wherein melt polymerization is carried out at temperatures at which the halogen-containing aromatic diol is not decomposed to prepare a prepolymer with a low degree of polymerization, after which it is polycondensed in a solid phase under a high degree of vacuum or in a stream of an inert gas thereby obtain a polyester which is substantially free of coloration with corrosive gases being generated only in small amounts and which has an appropriate degree of polymerization (Japanese Laid-open Patent Application No. 62-161826).

However, when this process is applied for polyarylate in order to obtain melt molding articles, a molding temperature of, for example, 320° C. or over is necessary, eventually leading to a slight degree of thermal decomposition of the halogen-containing aromatic diol. A long time is necessary for the solid phase polymerization with attendant problems of a reduction of productivity and a necessity of an additional solid phase polymerization apparatus.

To be more important is that in either case of the addition of the flame retardant or the copolymerization of halogenated monomer, although the combustion time can be shortened, dripping of the melt during the combustion cannot be prevented. The improvement of the dripping property is very important from the standpoint of the spread of a fire.

In the fields of electric and electronic materials, for example, it is required to reduce the content of corrosive ingredients as small as possible from the standpoint of preventing corrosion of electrode. Accordingly, in these fields, use of known flame retardants and their aids containing corrosive components such as, for example, halides, antimony trioxide and the like is not possible. If these known flame retardants and aids therefor are used, limitation is placed on the application of such moldings.

As described above, an industrially appropriate process of preparing polyarylate resins by melt polymerization has not been established yet and thus, polyarylate resins having good mechanical strength, heat resistance, resistance to color change, transparency, moldability and flame retardancy have never been provided up to now.

It will be noted that the term "resistance to color change" is intended to mean unlikelihood to coloration during the preparation of polyarylate resins.

On the other hand, the polyarylate and polyamide are not miscible with each other and the composition obtained by melt kneading the mixture exhibits a phase separation structure wherein because the adhesion strength at the interface between the polyarylate phase and the polyamide phase is weak, the composition has a small impact strength and is brittle.

An object of the invention is to provide a polyarylate resin which is improved in moldability which is an inherent detriment to known polyarylate resins, which has good transparency, mechanical strength and impact strength without containing corrosive components and which are improved in flame retardancy and dripping properties.

Another object of the invention is to provide a thermoplastic resin composition of a polyarylate and a polyamide which is significantly improved in impact strength without a sacrifice of resistances to solvent and heat, moldability, high rigidity and thermal stability which are inherently possessed by those resin compositions.

SUMMARY OF THE INVENTION

According to a first embodiment of the invention, there is provided an improved polyarylate which comprises the following units (I) to (IV)

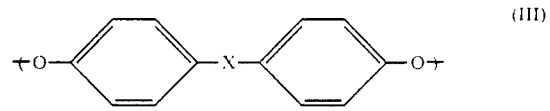

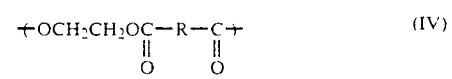

wherein each R in the units (I), (II) and (IV) independently represents a paraphenylene group, a metaphenylene group, a 4,4'-biphenylene group or a 2,6-naphthalene group, and X represents

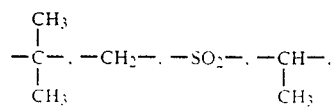

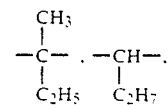

-continued

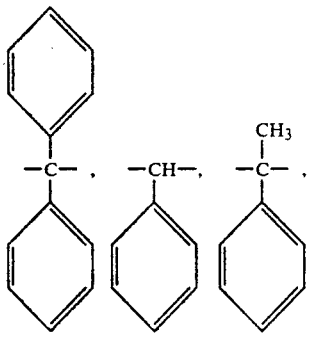

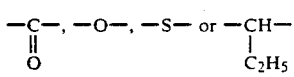

provided that any hydrogen atom directly joined to the aromatic ring of each of the units (I) to (IV) may be substituted with an alkyl group having from 1 to 6 carbon atoms or an alkoxy group having from 1 to 6 carbon atoms, and the units (I) to (IV) may have one R, more than one R, one X or more than one X respectively, the units (I) being contained in an amount of from 3 to 30 mole %, the units (II) being contained in an amount of not less than 30 mole %, the units (III) being contained in an amount of not less than 30 mole %, and the units (IV) being contained in amount of not larger than 25 mole %, each based on the total moles of the units (I) to (IV).

According to a second embodiment of the invention, there is also provided a thermoplastic resin composition which comprises 100 parts by weight of a mixture comprising from 10 to 90 wt % of a polyarylate-based resin containing not less than 70 wt % of the polyarylate resin component defined above, from 90 to 10 wt % of a polyamide-based resin containing not less than 70 wt % of a polyamide resin component, and from 0.1 to 15 parts by weight of an epoxy resin of the following formula

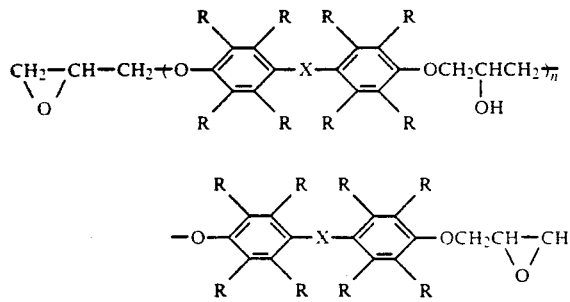

wherein X represents a direct bond, a lower alkylene group having from 1 to 4 carbon atoms,

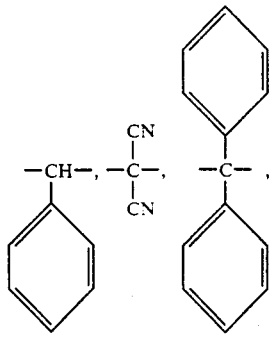

—SO$_2$—, —O— or —S— wherein each R independently represents a hydrogen atom or a lower alkyl group having from 1 to 4 carbon atoms, and n is an integer of 1 or over.

According to the third embodiment of the invention, there is provided a thermoplastic resin composition which comprises 100 parts by weight of a resin mixture consisting essentially of not less than 10 wt % of a polyarylate resin, not less than 20 wt % of a polyamide resin and from 3 to 60 wt % of a polyethylene terephthalate resin, and from 0.1 to 15 parts by weight of the epoxy resin of the above described formula.

In these embodiments, the polyarylate resin should preferably have an inherent viscosity of not less than 0.50 dl/g when measured at a concentration of 0.25 g/dl at a temperature of 23° C. in a solvent of phenol and tetrachloroethane at a mixing ratio by weight of 60/40. Also, it is preferred that the content of the unit (IV) for the polyarylate resin is from 2 to 25 mole % of the total moles of the units (I) to (IV).

DETAILED DESCRIPTION OF THE INVENTION

Figure 1:
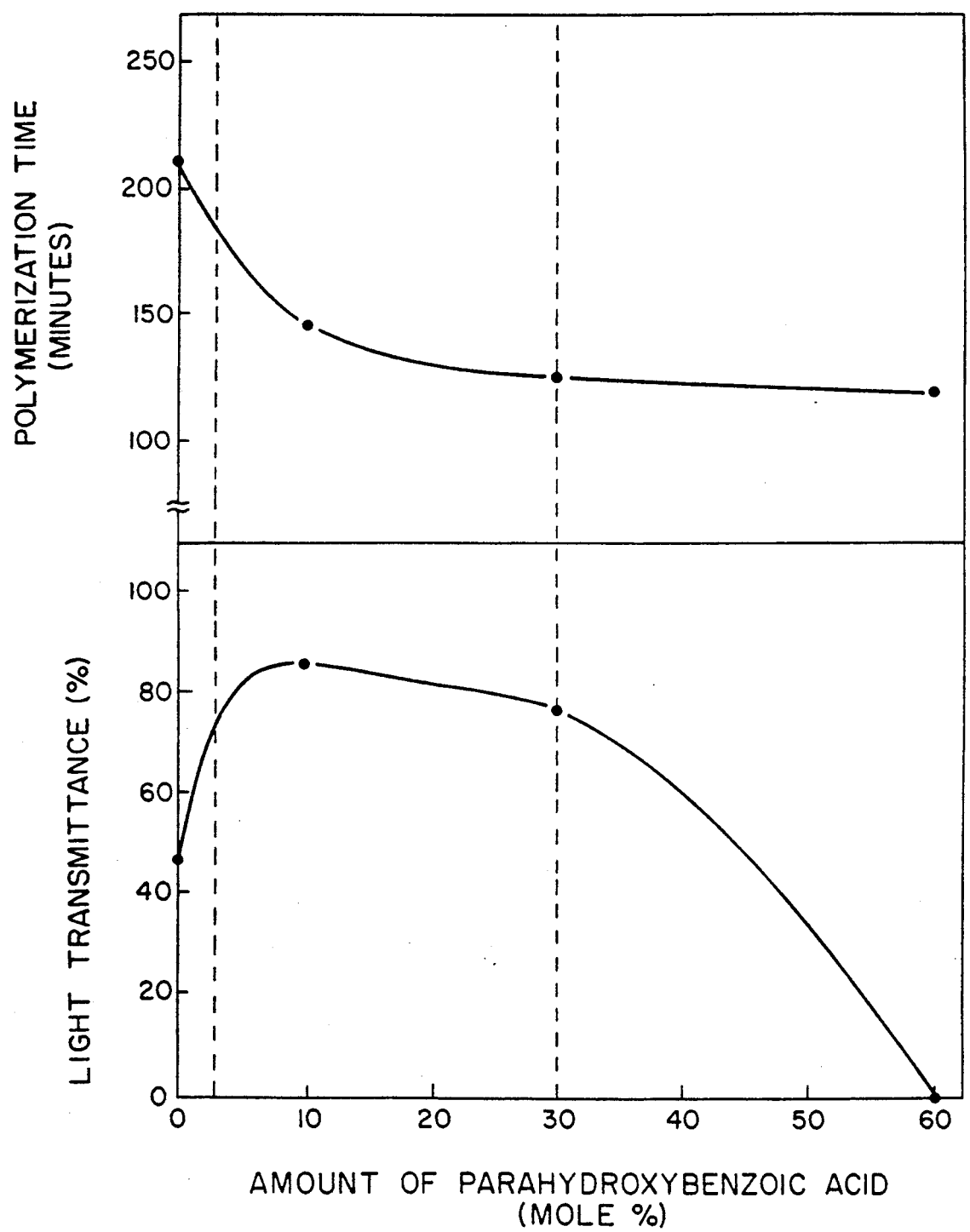
FIG. 1 is a graphical representation of the light transmittance and the rate of polymerization in relation to the variation in the content by mole % of starting parahydroxybenzoic acid (units I)

The improved polyarylate resin according to a first embodiment of the invention is comprised of the following units (I) to (IV)

 (I)

-continued $$-(-C-R-C-)- \quad (II)$$
$$\phantom{xxxxx}\overset{\|}{O}\phantom{xx}\overset{\|}{O}$$

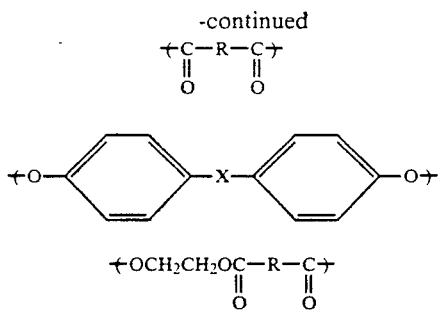  (III)

$$-(-OCH_2CH_2OC-R-C-)- \quad (IV)$$
$$\phantom{xxxxxxxxxxx}\overset{\|}{O}\phantom{xx}\overset{\|}{O}$$

wherein each R in the respective units independently represents a paraphenylene group, a metaphenylene group, a 4,4'-biphenylene group or a 2,6-naphthalene group, and X represents

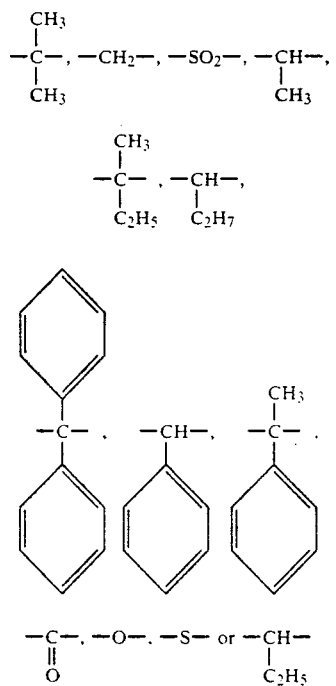

provided that any hydrogen atom directly joined to the aromatic ring of each of the units (I) to (IV) may be substituted with an alkyl group having from 1 to 6 carbon atoms or an alkoxy group having from 1 to 6 carbon atoms, and the units (I) to (IV) may have one R, more than one R, one X or more than one X respectively, the units (I) being contained in an amount of from 3 to 30 mole %, the units (II) being contained in an amount of not less than 30 mole %, the units (III) being contained in an amount of not less than 30 mole %, and the units (IV) being contained in an amount of not larger than 25 mole %, each based on the total moles of the units (I) to (IV).

The unit (I) is expressed by the formula

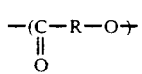

and are an essential component for showing the flame retardant effect or shortening the combustion time and for preventing dripping.

The starting material capable of yielding the units (I) includes, for example, parahydroxybenzoic acid, meta-hydroxybenzoic acid, 2-hydroxy-6-naphthoic acid and ester derivatives thereof.

In the unit (I), R is preferably a divalent group selected from a paraphenylene group, a metaphenylene group, a 4,4'-biphenylene group and a 2,6-naphthalene group. In particular, a parahydroxybenzoic acid (or its derivative) wherein R represents a paraphenylene group is most preferred.

One or more of these substituents or units may be contained in moldings. The hydrogen atom or atoms on the aromatic ring in R may be substituted with an alkyl group having from 1 to 6 carbon atoms or an alkoxy group having from 1 to 6 carbon atoms.

The unit (II) is represented by the formula,

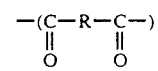

and is a divalent functional group selected from a paraphenylene group, a metaphenylene group, a 4,4'-biphenylene group and a 2,6-naphthalene group and one or more of these units may be contained in moldings. In addition, the hydrogen atom or atoms on the aromatic ring in R may be substituted with an alkyl group having from 1 to 6 carbon atoms or an alkoxy group having from 1 to 6 carbon atoms. In view of the ease in availability of starting materials, the unit (II) is preferably terephthalic acid, isophthalic acid, 2,6-naphthalenedicarboxylic acid, 4,4'-diphenyldicarboxylic acid or derivatives thereof. It is more preferred to use terephthalic acid and its derivative and isophthalic acid and its derivative in combination for incorporation in moldings.

The unit (III) is represented by the following formula

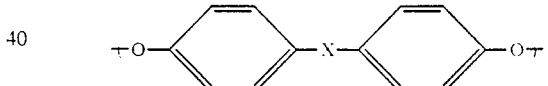

wherein X represents

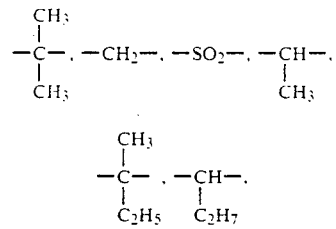

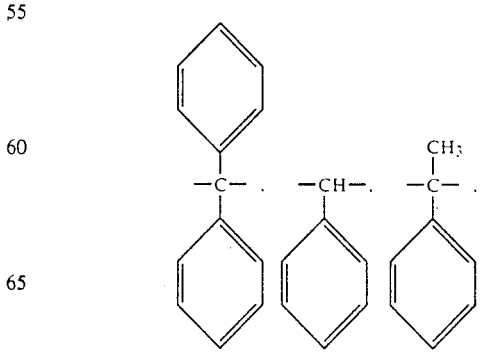

-continued $$-\overset{\underset{\|}{O}}{C}-,\ -O-,\ -S-\ or\ -\overset{\underset{|}{C_2H_5}}{CH}-$$

wherein any hydrogen atom on the aromatic ring may be substituted with an alkyl group having from 1 to 6 carbon atoms or an alkoxy group having from 1 to 6 carbon atoms. In view of the ease in availability, preferable starting materials capable of yielding the unit (III) include bis (4-hydroxyphenyl) sulfone, bis (4-hydroxyphenyl) methane, bis (4-hydroxy-3-methylphenyl) methane, 1,1-bis (4-hydroxyphenyl) ethane, 2,2-bis (4-hydroxy-3-methylphenyl) propane, 1,1-bis (4-hydroxyphenyl) butane, 2,2-bis (4-hydroxyphenyl) butane, bis (4-hydroxyphenyl) phenylmethane, bis (4-hydroxyphenyl) diphenylmethane and acetic ester derivatives thereof.

Futhermore, the unit (III) should preferably be 2,2-bis (4-hydroxyphenyl) propane, i.e. bisphenol A (or its derivative), wherein X is $$-\overset{\underset{|}{CH_3}}{\underset{CH_3}{C}}-$$

The unit (IV) is represented by the formula $$-(OCH_2CH_2O\overset{\|}{C}-R-\overset{\|}{C}\!\!+\!\!\\ \quad\quad\quad\quad O\quad\quad\quad O$$

wherein R is a divalent functional group, and includes, for example, a paraphenylene group, a metaphenylene group, a 4,4'-biphenylene group or a 2,6-naphthalene group provided that any hydrogen atom on the aromatic group in R may be substituted with an alkyl group having from 1 to 6 carbon atoms or an alkoxy group having from 1 to 6 carbon atoms. One or more units (IV) may be contained in the molecule of produced polyarylate.

The starting materials capable of yield the unit (IV) polyethylene terephthalate, polyethylene 2,6-naphthalate or the like. In view of the ease in availability, the unit (IV) should preferably be polyethylene terephthalate.

The ratios of the units (I) to (IV) present in the polyarylate are now described.

Figure 2:
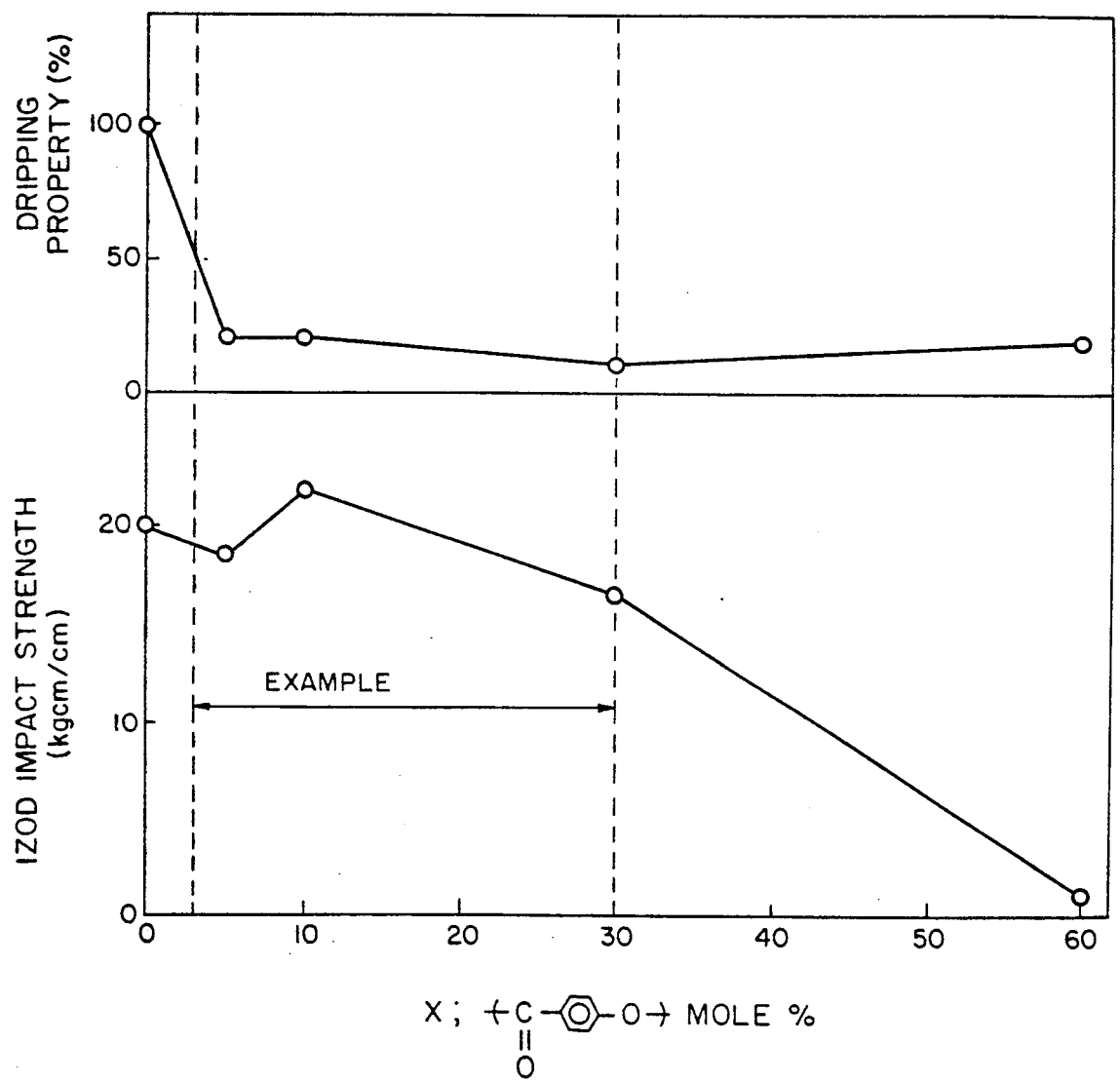
FIG. 2 is a graphical representation of the Izod impact strength and dripping properties in relation to the content by mole % of parahydroxybenzoic acid.

The unit (I) is generally contained in amount of from 3 to 30 mole %, preferably from 5 to 20 mole % based on the total moles of the units (I) to (IV) in moldings. If the content of the unit (I) is less than 3 mole %, a desired retardant effect cannot be obtained. Over 30 mole %, the transparency and impact strength are lowered. In FIGS. 1 and 2, the criticality of the content of unit (I) is shown. The relation between the content by mole % of parahydroxybenzoic acid (unit I) and the rate of polymerization and light transmittance is shown in FIG. 1, and the relation between the content by mole % and the Izod impact strength and dripping properties is shown in FIG. 2

Other starting materials used were 5 mole % of polyethylene terephthalate (unit IV), and a mixture of isophthalic acid (unit II): terephthalic acid (unit II): bisphenol A (unit III)=0.5:0.5:1 (molar ratio).

As will be apparent also from Tables 1 and 4, when the content of the unit (I) is less than 3 mole %, the rate of polymerization lowers, so that it takes a long time before the resultant polyarylate reaches a molecular weight sufficient to show satisfactory mechanical strength. This results in a prolonged heating time with a considerable degree of coloration. Moreover, the combustion time becomes long with poor dripping properties and a lowering of flame retardancy.

On the other hand, when the content of the unit (I) exceeds 30 mole %, the polymerization time is shortened with the unlikelihood to coloration, good dripping properties and satisfactory flame retardancy, but the transparency and impact strength are sacrificed.

The units (II) and (III) should preferably be present in amounts of not less than 30 mole % based on the total moles of the units (I) to (IV), respectively. If the amount is less than 30 mole %, the mechanical strength and particularly, Izod impact strength, is lowered and the resultant molding becomes brittle.

The molar ratio of the unit (II)/the unit (III) should preferably be from 0.9 to 1.1. More preferably, the units (II) and (III) are present in the molecule of the polymer in equimolar amounts.

The amount of the unit (IV) should be present in amounts of not larger than 25 mole %, preferably from 2 to 25 mole % and more preferably from 2 to 10 mole %. The criticality of the content is shown in FIGS. 3 and 4.

Figure 3:
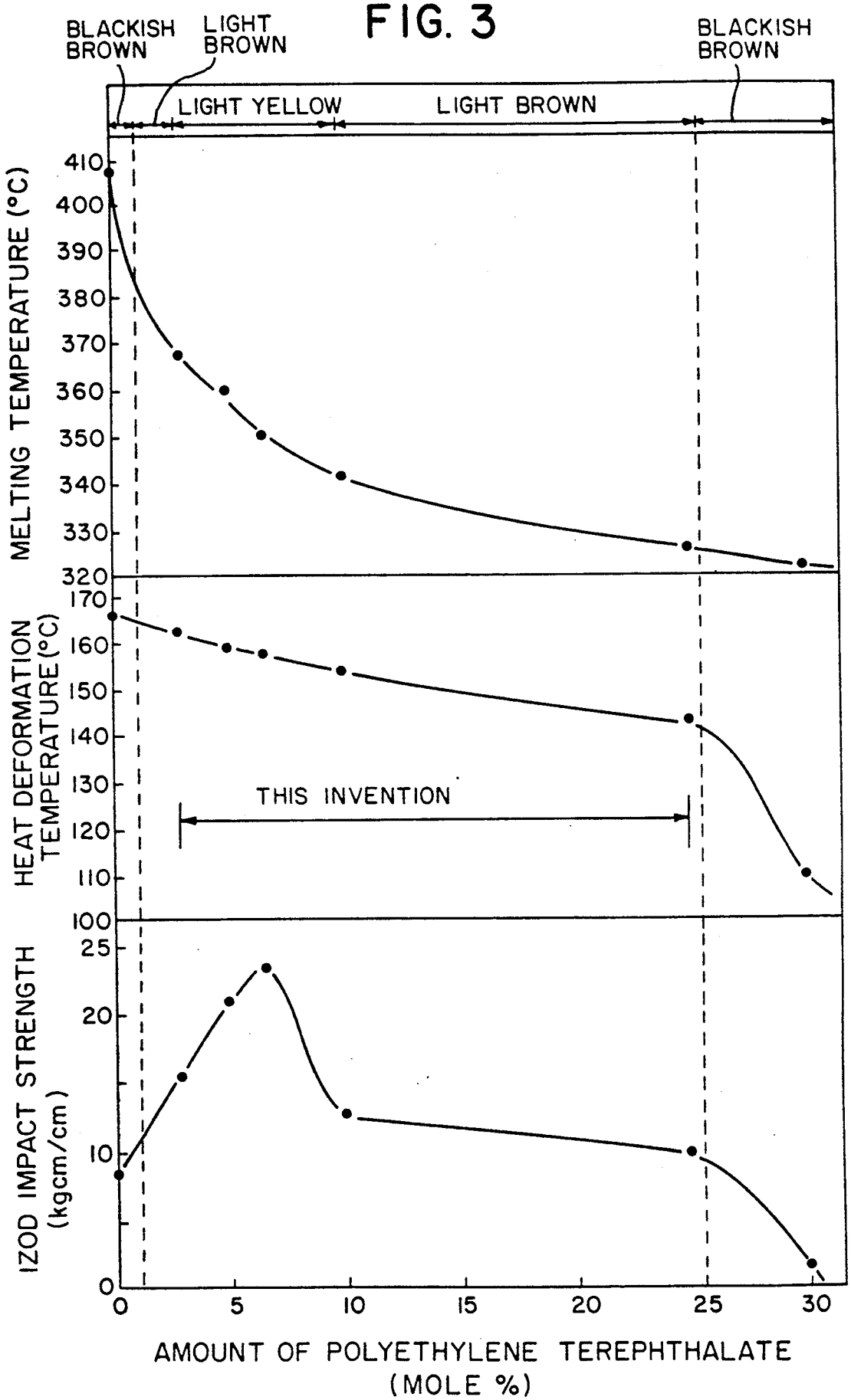
FIG. 3 is a graphical representation of the Izod impact strength, heat deformation temperature, melting temperature and degree of coloration in relation to the content by mole % of starting polyethylene terephthalate (unit IV)

In FIG. 3, there is shown the relation between the content by mole % of polyethylene terephthalate unit (IV) in charged starting materials and the Izod impact strength, heat deformation temperature, melting temperature and degree of coloration. In FIG. 4, there is shown the relation between the content by mole % of the above-indicated unit (IV) and the dripping properties and light transmittance.

Other starting materials used were 10 mole % of parahydroxybenzoic acid (unit I) and a mixture of isophthalic acid (unit II): terephthalic acid (unit II): bisphenol A (unit III)=0.5:0.5:1 (molar ratio).

Figure 4:
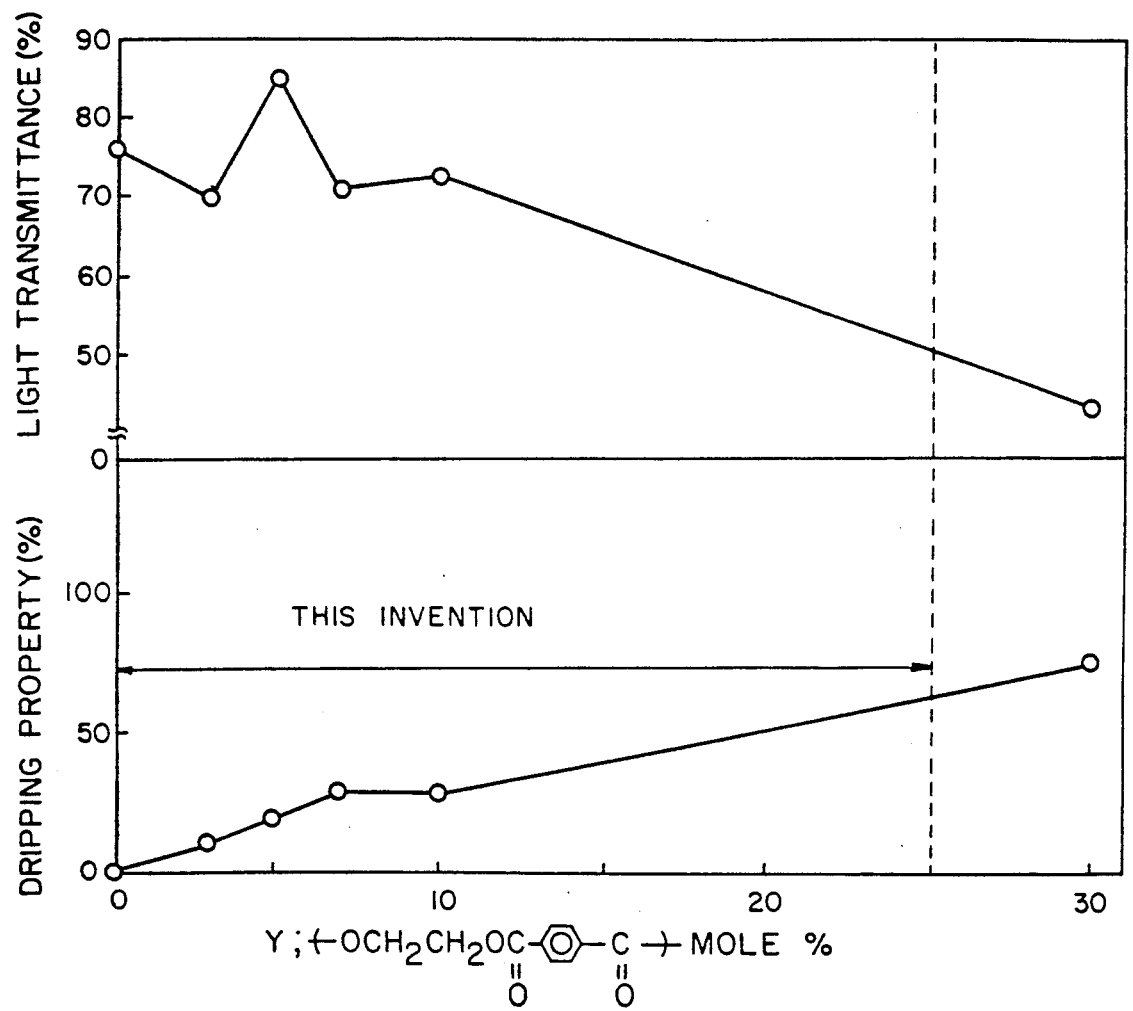
FIG. 4 is a graphical representation of the dripping properties and light transmittance in relation to the content by mole % of polyethylene terephthalate.

As will be apparent from FIGS. 3 and 4 and Tables 1 and 5, when the content of the unit (IV) exceeds 25 mole %, the melting temperature and melt viscosity lower, so that the preparation and molding operation beneficially become easy, but the heat resistance, heat deformation temperature and impact strength which are inherent merits of bisphenol A-based polyarylates are lowered. In addition, the polymerization takes a long time with a prolonged heating time, a considerable degree of coloration and a lowering of transparency.

The polyarylate resin of the invention has an inherent viscosity of not less than 0.50 dl/g, preferably from 0.55 dl/g to 0.8 dl/g, when determined at a concentration of 0.25 dl/g at a temperature of 23° C. in a mixed solvent of phenol and tetrachloroethane at a mixing ratio by weight of 60:40. However, as indicated in Example 18(2) which follows, polyarylate resins having inherent viscosities slightly lower than 0.50 dl/g, for example 0.47 dl/g, are also contemplated within the scope of this invention. It will be noted that the inherent viscosity is hereinafter measured in the same way as set out above.

Figure 5:
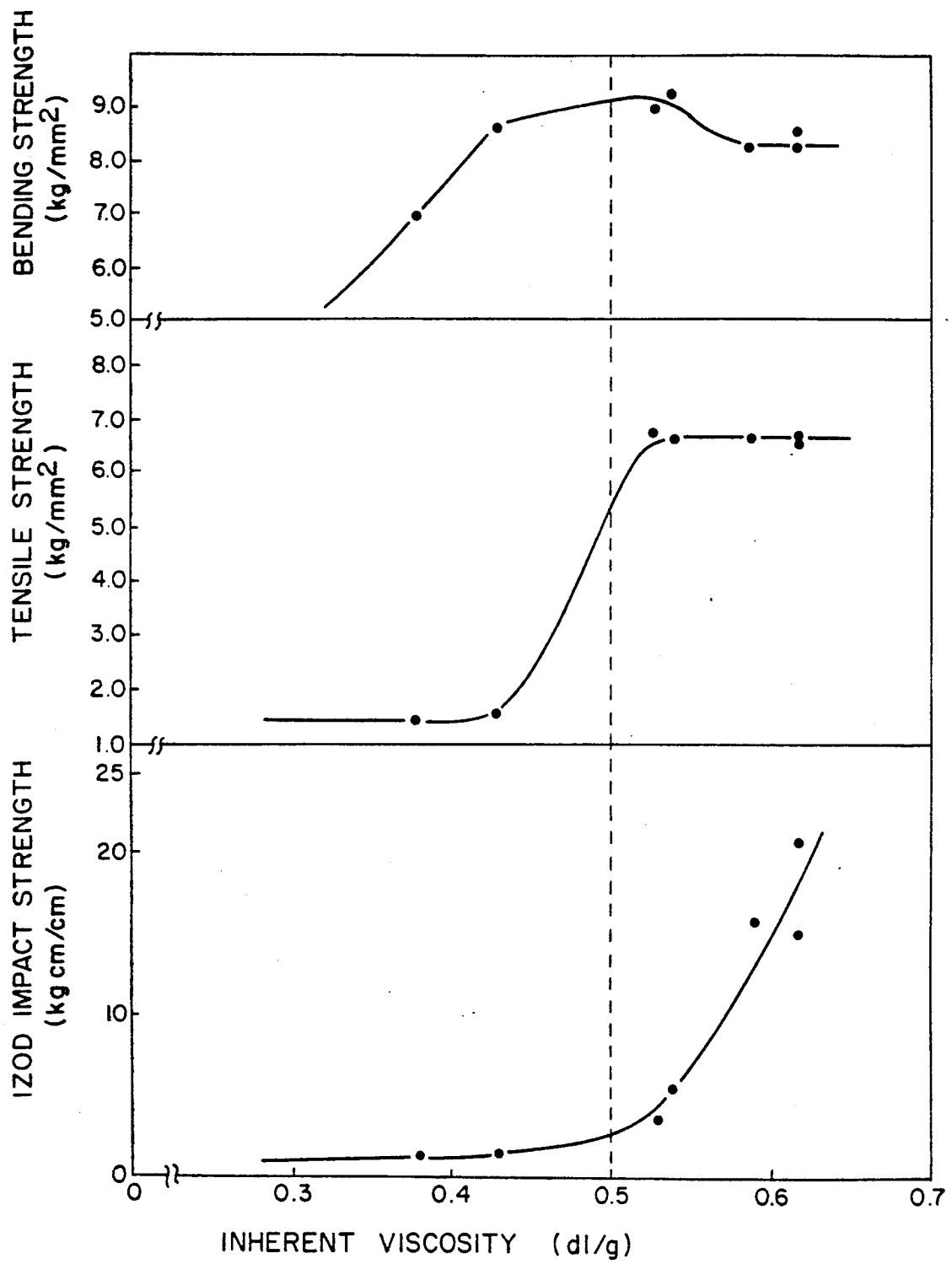
FIG. 5 is a graphical representation of the Izod impact strength, tensile strength and bending strength in relation to the molecular weight (inherent viscosity) of the polyarylate resin.

In FIG. 5, there is the relation between the molecular weight (inherent viscosity) of polyarylate resin and the Izod impact strength, tensile strength and bending strength.

The composition of the starting materials for the above purpose was comprised of 10 mole % of parahydroxybenzoic acid (unit I), 21.25 mole % of isophthalic acid (unit II), 21.25 mole % of terephthalic acid (unit II), 42.5 mole % of bisphenol A (unit III) and 5 mole % of polyethylene terephthalate (unit IV).

As will be clear from FIG. 5, when the inherent viscosity is below 0.50 dl/g, the mechanical strength, particularly Izod impact strength and tensile strength, become very low, thus leading to a very brittle resin.

In the preparation of the polyarylate resin of the invention, when starting materials capable of yielding the units (I) to (IV) are formulated and subjected to polymerization reaction even under conditions where neither coloration nor decomposition of the resin takes place, the inherent viscosity of the resultant resin can be not less than 0.50 dl/g.

The preparation of the polyarylate resin of the invention is described.

In general, polyarylate resins can be prepared by melt polymerization, solution polymerization, interfacial polymerization and the like. The polyarylate resin of the invention is preferably prepared by melt polymerization according to an ester exchange method. For instance, a polyester, a phenyl ester of an aromatic dicarboxylic acid, a bisphenol and a phenyl ester of an aromatic oxycarboxylic acid corresponding to the units (I) to (IV), respectively, may be heated and polymerized while removing a produced phenol. Alternatively, a polyester, an aromatic dicarboxylic acid, a diacetate of bisphenol and an aromatic acetoxycarboxylic acid corresponding to the units (I) to (IV), respectively, are heated and polymerized while removing produced acetic acid. Of these, the latter process wherein the acetylated starting material is used is preferred. The reason for this is that the acetylated starting material can be simply prepared by reaction between a corresponding aromatic hydroxy compound and acetic anhydride and is thus readily available.

One example of a process of the polyarylate resin of the invention by melt polymerization is described.

The reaction is started by placing necessary starting materials such as a polyester, an aromatic dicarboxylic acid, a bisphenol diacetate, an aromatic acetoxycarboxylic acid and, if necessary, a catalyst in a polymerization container and heating the materials for a time sufficient to complete the polymerization. The acetylated starting material may be prepared from a corresponding aromatic hydroxy compound and acetic anhydride in the polymerization container.

The polymerization temperature is not critical and is generally in the range of from 180 to 400° C., preferably from 200 to 360° C.. If the temperature is lower than 180° C., the reaction does not proceed quickly. Over 400° C., the resin suffers considerable degrees of coloration and decomposition.

The pressure at the time of the reaction is not critical and is preferably controlled such that the reaction is initially effected in the vicinity of an atmospheric pressure and is gradually reduced in pressure as the polymerization proceeds.

In order to prevent coloration and decomposition of the resin by local overheating and to facilitate removal of produced acetic acid, the reaction should preferably carried out under agitation. Moreover, in order to prevent decomposition of the resin by oxidation, the reaction system should preferably be in an atmosphere of an inert gas such as nitrogen, argon or the like.

The polymerization reaction may be effected in the absence of any catalyst and a catalyst may be used for facilitating the polymerization reaction. The catalyst may be incorporated in the starting materials or may be added at the initial stage of the reaction.

Examples of the catalyst include germanium compounds such as germanium oxide, tin compound such as stannous oxalate, stannous acetate, dialkyl tin oxides, diaryl tin oxides and the like, titanium compounds such as titanium dioxide, titanium alkoxides, alkoxy titanium silicates and the like, antimony compounds such as antimony trioxide, metal salts of organic acids such as sodium acetate, potassium acetate, calcium acetate, zinc acetate, ferrous acetate and the like, Lewis acids such as boron trifluoride, aluminum chloride and the like, amines, amides, and inorganic acids such as hydrochloric acid, sulfuric acid and the like.

Preferably, sodium acetate, potassium acetate, germanium acetate and titanium isopropoxide are mentioned.

The polyarylate resin of the invention may be incorporated with fillers and additives in amounts not impeding the effect of the invention at a stage of the polymerization or molding.

Examples of the filler include inorganic fillers such as talc, calcium carbonate, mica, wollastonite, ferrite, rare earth element magnetic powders and the like, and fibrous reinforcing agents such as glass fibers, carbon fibers, asbestos fibers and the like.

Examples of stabilizers or coloration inhibitors include phosphorus compounds such as triaryl phosphites, trialkyl phosphites, hydrogenphosphite diesters, pentaerythritol-type phosphite esters, trialkyl phosphate esters, triaryl phosphate esters, phosphonic acid derivatives, phosphinite derivatives, alkyl acid phosphates and the like, epoxy compounds such as monoglycidyl derivatives, diglycidyl derivatives and the like, sulfur compounds such as hydrosulfides, hindered phenol derivatives, mercapto benzothiazoles, UV absorbers such as benzotriazoles, metal inactivating agents and the like. Preferably, phosphite esters and hindered phenol derivatives are used as a stabilizer or coloration inhibitor.

Examples of the flame retardant include aluminum hydroxide, ammonium phosphate, tricresyl phosphate, triethyl phosphate and the like.

Moreover, releasing agents and plasticizers such as silicone resins, paraffin wax, microcrystalline wax, liquid paraffin, montanic acid and the like may be added in appropriate amounts in order to improve moldability.

The polyarylate resin of the invention may be further incorporated with one or more of polymers such as, for example, polyalkylene terephthalates such as polyethylene terephthalate, polybutylene terephthalate and the like polyamides such as nylon 6, nylon 66 and the like, epoxy compounds such as epoxy resins, polyethylene oxybenzoate, polycarbonates, polyethylene, polypropylene, polyurethanes, polystyrene, polymethyl methacrylate, polyphenylene sulfide, rubbers, phenoxy resins, polyphenylene oxide, polysulfones and the like, if necessary.

The melt moldings may be fabricated from the polyarylate resin of the invention. Melt moldings include, for example, fibers, films, sheets, extrusion moldings, injection moldings, blow moldings, compression moldings and the like.

The application of the polyarylate of the invention to moldings from melt. The melt moldings of the invention may be fabricated by any techniques such as spinning, extrusion molding, injection molding, blow molding and compression molding.

The temperature and pressure for obtaining these melt moldings may be arbitrarily set but appropriate ranges of the temperature and pressure exist in order to obtain satisfactory results. With the injection molding, typical temperature and pressure ranges include a cylinder temperature of from 300° to 400° C. and an injection pressure of from 200 to 1500 kgf/cm².

The melt moldings fabricated from the polyarylate resin of the invention can be further improved in the heat resistance and mechanical strength by subjecting the molded product to heat treatment. This is because residual stress and strain produced during the molding can be relaxed by the heat treatment.

The heat treatment can be carried out in an inert gas atmosphere such as, for example, nitrogen, carbon dioxide, argon or helium or in a stream of an oxygen-containing atmosphere or in vacuum. In order to prevent the polymer from deterioration by oxidation, it is preferred to carry out the treatment in an inert gas atmosphere or in vacuum. The heat treatment temperature is generally in the range of from 60° to 230° C., preferably from 100° to 180° C. At lower temperatures, a satisfactory effect of the heat treatment cannot be expected. Higher temperatures will cause deformation or melting of the moldings. It is more effective to increase the heat treatment temperature in a stepwise manner with time.

The heat treatment time is generally, in the range of from several minutes to several hundred hours, preferably from 1 to 48 hours and more preferably from 5 to 24 hours. Usually, the heat treatment time depends on the heat treatment temperature. If high heat treatment temperatures are used, the heat treatment time can be shortened so far.

The thus obtained moldings have improved flame retardancy over polyarylate melt moldings obtained by known techniques. When compared with known flame retardant polyarylates which have been improved in the flame retardancy by prior technique by incorporation of a flame retardant such as a halogen-containing aromatic compound, the polyarylate of the invention does not contain any flame retardant and any thermal decomposition of flame retardant takes place at the stage of molding. This leads to better transparency, a less degree of coloration and better mechanical strength. In addition, any corrosive component is not contained. Accordingly, the polyarylate of the invention is utilizable in the field of electric and electronic instruments. Further, the polyarylate is conveniently improved in dripping properties during combustion.

Features of the invention are described while comparing the polyarylate resin of the invention with copolymerized polyesters set out in literature.

(1) Polyesters consisting of units (II) and (III) are known from old. The polyester have a very high melt viscosity with a very high melting temperature, presenting the problem with respect to a polymerization apparatus and particularly, an agitator when the melt polymerization process is used. Additionally, coloration and decomposition of the resin takes place considerably and, thus, polyesters in practical sense cannot be obtained.

Accordingly, such polyesters are industrially prepared by solution polymerization or interfacial polymerization which needs higher costs.

(2) Processes of preparing polyesters of units (II), (III) and (IV) by melt polymerization are disclosed in Japanese Laid-open Patent Application Nos. 48-88193 and 58-185615. In these processes, the melting temperature and melt viscosity lower by addition of the unit (IV) component, so that the problem on the polymerization apparatus in (1) is solved. However, a long time is necessary before the produced polyester reaches a molecular weight sufficient to give satisfactory mechanical strength, during which the resin undergoes coloration and has no practical value.

When the polymerization time is compared, Japanese Laid-open Patent Application No. 58-185615 describes, for example, in Example 1 that it takes 240 minutes or over in order to obtain a resin having an inherent viscosity of 0.45 dl/g, whereas according to the process of the invention, a resin having an inherent viscosity of 0.62 dl/g is obtained only in 145 minutes.

(3) U.S. Pat. No. 4,075,173 discloses a process for preparing a polyester consisting of units (I), (II) and (III). Since this polyester has high melt viscosity and melting temperature, it is not possible to obtain a polyester having a good appearance by melt polymerization. To avoid this, in the U.S. Pat. No. 4,075,173, a prepolymer is initially prepared by melt polymerization and is subjected to solid phase polymerization. Thus, this process is disadvantageous in that additional steps of cooling and milling the prepolymer are required along with an additional solid phase polymerization apparatus.

The unit (IV) used in the present invention is an essential component for lowering the melting temperature and melt viscosity of the resin. The incorporation of the unit (IV) results in a tough resin whose impact strength is remarkably increased. On the other hand, the unit (I) is an essential component by which the rate of polymerization is increased. Accordingly, the units (I) to (IV) used as the essential components in the present invention enables one to obtain a polyarylate resin of a practical merit by melt polymerization. The polyarylate resin of the invention has better moldability and is tougher than known polyarylate resins consisting of the units (II) and (III).

The resin composition of the invention is now described.

The resin composition comprises 100 parts by weight of a mixture comprising from 10 to 90 wt % of a polyarylate-based resin containing not less than 70 wt % of the polyarylate resin component defined above, from 90 to 10 wt % of a polyamide-based resin containing not less than 70 wt % of a polyamide resin component, and from 0.1 to 15 parts by weight of an epoxy resin of the following formula

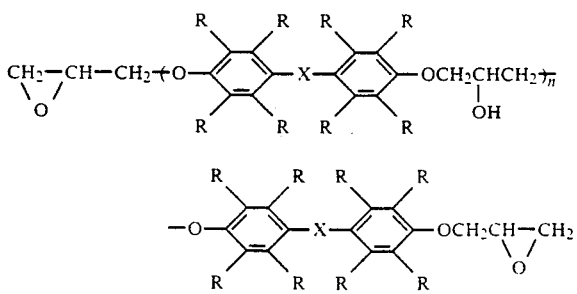

wherein X represents a direct bond, a lower alkylene group having from 1 to 4 carbon atoms,

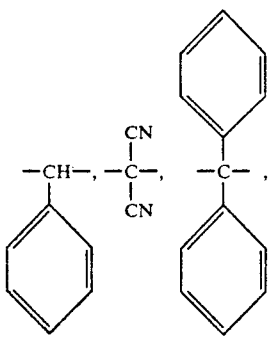

—S$_2$—, —O— or —S— wherein each R independently represents a hydrogen atom or a lower alkyl group having from 1 to 4 carbon atoms, and n is an integer of 1 or over.

The polyarylate-based resin used herein is intended to mean a resin which containing not less than 70 wt % of an improved polyarylate resin defined before.

For instance, those mixtures containing not less than 70 wt % of an improved polyarylate resin component of the invention are within the scope of the invention, which include mixtures of the polyarylate resin and polybutylene terephthalate, mixtures of the polyarylate resin and a polysulfone resin of the following formula.

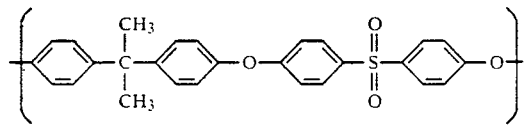

mixtures of the polyarylate resin and a polycarbonate resins of the following formula

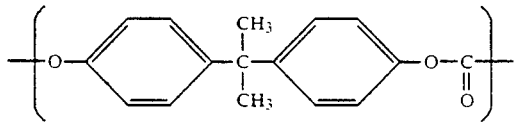

mixtures of the polyarylate resin and a polyphenylene sulfide of the following formula

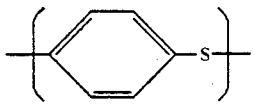

mixtures of the polyarylate resin and polyphenylene oxide of the following formula

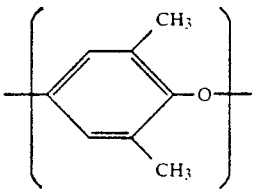

mixtures of the polyarylate resin and polyether sulfone of the following formula

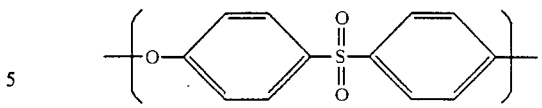

mixtures of the polyarylate resin and polyester polycarbonate resins, mixtures of the polyarylate resin and aromatic liquid crystalline polyesters, mixtures of the polyarylate resin and polyether ketone resins, and mixtures of the polyarylate resin and polyether ether ketone resins.

Moreover, a polyarylate resin which is obtained by copolymerizing, aside from a bisphenol, terephthalic acid, isophthalic acid and derivatives thereof, an aromatic dicarboxylic acid such as polyethylene terephthalate, 2,6-naphthalene dicarboxylic acid or 4,4'-diphenyldicarboxylic acid and its derivative, and/or an aromatic hydroxycarboxylic acid such as paraacetoxybenzoic acid or 2-hydroxy-6-naphthoic acid and its derivative is within the scope of the polyarylate-based resin provided that this resin contains not less than 70 wt % of an improved polyarylate resin component.

The polyamide resin useful in the present invention is of the following general formula

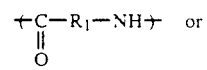

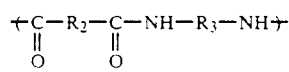

wherein $R_1$, $R_2$ and $R_3$ independently represent an alkylene group having from 2 to 16 carbon atoms. These resins are prepared through condensation reaction of diamines and dibasic acids, self-condensation of amino acids, or ring-open polymerization of lactams. Examples of the polyamide include nylon 6 prepared from ε-caprolactam or ε-aminocaproic acid, nylon 6-6 prepared from hexamethylenediamine and adipic acid, nylon 6-10 prepared from hexamethylenediamine and sebacic acid, nylon 6-12 prepared from hexamethylenediamine and dodecanoic diacid, nylon 11 prepared from ω-aminoundecanoic acid, nylon 12 prepared from ω-laurolactam or ω-aminododecanoic acid, and nylon 4-6 prepared from 1,4-diaminobutane and adipic acid. In view of the ease in availability of starting materials, nylon 6 and nylon 6-6 are preferably used.

The polyamide-based resin is intended to mean a resin which contains not less than 70 wt % of the polyamide resin component defined above. Examples of the polyamide-based resin include so-called high impact strength nylons such as blends of the polyamide resins and polyolefins and/or modified polyolefins, and graft copolymers of ethylene-(meth)acrylate copolymers with the polyamide resins (Japanese Patent Publication No. 44-29262), and polyamide elastomers obtained by subjecting polytetramethylene glycol to block copolymerization with the polyamide resins. The modified polyolefins are those polyolefins which are modified by copolymerization of α,β-unsaturated carboxylic acids or esters thereof, glycidyl ether or metal salt derivatives, and which are modified by copolymerization or graft copolymerization of acid anhydrides. Examples of the modified polyolefins include ionomer resins obtained by ionizing ethylene-methacrylic acid or ester with Na, Zn, Mg or the like, modified EPDM obtained by graft copolymerizing ethylene-propylene-diene copolymers with maleic anhydride, polypropylene or polyethylene graft copolymerized with maleic anhydride, ethylene-glycidyl methacrylate-vinyl acetate copolymers, styrene-maleic anhydride-acrylic ester copolymers, and the like.

Moreover, blends of the polyamides with other resins such as, for example, ABS resins, acrylic ester copolymers, rubber-modified styrene-maleic anhydride copolymers and polyphenylene ethers are within the scope of the polyamide-based resin of the invention provided that the polyamide component is contained in amounts of not less than 70 wt %.

The epoxy resin used in the present invention is represented by the following general formula

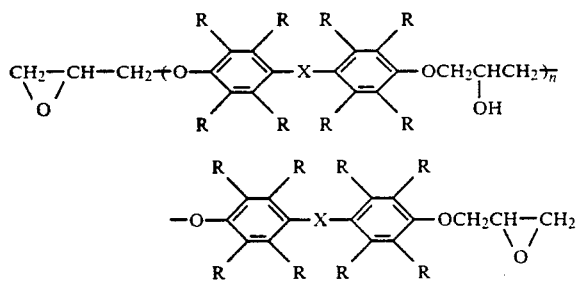

wherein X represents a direct bond, a lower alkylene group having from 1 to 4 carbon atoms,

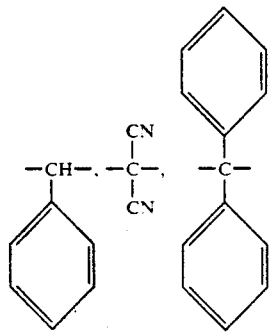

—$SO_2$—, —O— or —S— wherein each R independently represents a hydrogen atom or a lower alkyl group having from 1 to 4 carbon atoms, and n is an integer of 1 or over. The epoxy resin is obtained by reaction between a bisphenol and epichlorohydrin.

Examples of the bisphenol include the examples described for the first embodiment of the invention. Because of the ease in availability of starting materials, 2,2-bis(4-hydroxyphenyl)propane or bisphenol A is preferably used.

The number, n, of recurring units in the general formula for the epoxy resin should be 1 or over. If n is zero, the terminal epoxy groups are liable to give an adverse influence and the resultant resin composition is apt to gel and undergo coloration and decomposition. In particular, the melting temperature and melt viscosity increase considerably, making the molding difficult. In order to satisfactorily develop the effect of improving the impact strength, it is preferred that a ratio between the terminal epoxy groups and the polyether polyol moieties in the recurring units is at an appropriate level. A preferable range of n is about 6 to 20. And a preferable range of epoxy equivalents is in the range of about 1000 to 3000 in the case of bisphenol A-type epoxy resins.

The epoxy resin used in the present invention may be those which are copolymerized with a small amount of diols other than bisphenols, including aromatic diols such as 2,6-naphthalenediol and hydroquinone, and aliphatic diols such as 1,4-butanediol, propylene glycol and ethylene glycol.

Once again, the polyarylate-based resin and the polyamide-based resin should, respectively, contain not less than 70 wt % of the improved polyarylate resin component and the polyamide resin component. If the content is less than 70 wt %, either or both of good impact strength and heat resistance of the improved polyarylate resin will be lost and either or both of good moldability and solvent resistance of the polyamide resin will be lost. Eventually, this leads to a lowering of one or more of the impact strength, heat resistance, moldability and solvent resistance with which the resin composition of the invention is characterized.

The proportion of the polyarylate-based resin is in the range of from 10 to 90 wt % and that of the polyamide-based resin is correspondingly from 90 to 10 wt %. If importance is placed on the heat resistance and impact strength, the polyarylate-based resin is used in larger amounts, whereas importance is placed on the moldability, larger amounts of the polyamide-based resin are used. For well-balanced heat resistance, impact strength and moldability, a compositional ratio is preferably from 30 to 60 wt % of the polyarylate-based resin and correspondingly from 70 to 40 wt % of the polyamide-based resin.

The epoxy resin used as a compatibilizing agent is added in an amount of from 0.1 to 15 parts by weight per 100 parts by weight of a mixture of the polyarylate-based resin and the polyamide-based resin. If the amount is less than 0.1 part by weight, the impact strength is not significantly improved. Over 15 parts by weight, the heat resistance of the composition lowers with increasing melting temperature and melt viscosity, making the molding difficult. Preferably, the amount is in the range of from 2 to 10 parts by weight.

In the preparation of the composition of the invention, any means capable of melt kneading the polyarylate-based resin, polyamide-based resin and epoxy resin may be used. For instance, a two-roll mill, the Banbury mixer, a single-screw extruder, a twin-screw extruder and the like are used. Alternatively, the composition may be molded while kneading in an injection molding machine. Preferably, a single-screw or twin-screw extruder of the high kneading type is used.

To the resin composition of the invention may be further added additives or fillers. Examples of the additive include antioxidants and heat stabilizers such as hindered phenols and the like, light stabilizers such as benzotriazoles and hindered amines, plasticizers such as paraffin waxes, higher fatty acids and esters thereof, metal salts and the like, lubricants such as silicone resins, fluorine resins and the like, flame retardants such as aluminum hydroxide, antimony trioxide, ammonium phosphate, tricresyl phosphate, triethyl phosphate and the like, pigments and dyes. Examples of the filler include talc, calcium carbonate, mica, wollastonite, ferrite, rare earth magnetic powders, glass fibers, carbon fibers, asbestos fibers, metallic fibers, aramide fibers, potassium titanate whiskers and the like.

Another resin composition of the invention is described.

According to the third embodiment of the invention, there is provided a thermoplastic resin composition which comprises 100 parts by weight of a resin mixture consisting essentially of not less than 10 wt % of an improved polyarylate resin, not less than 20 wt % of a polyamide resin and from 3 to 60 wt % of a polyethylene terephthalate resin, and from 0.1 to 15 parts by weight of an epoxy resin of the following formula

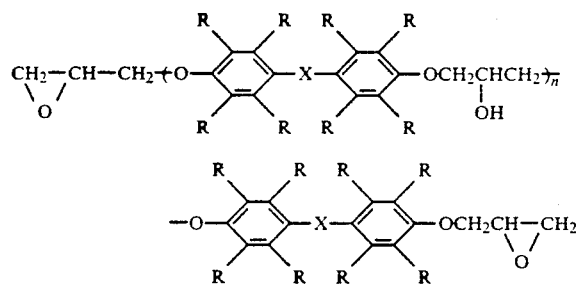

wherein X represents a direct bond, a lower alkylene group having from 1 to 4 carbon atoms,

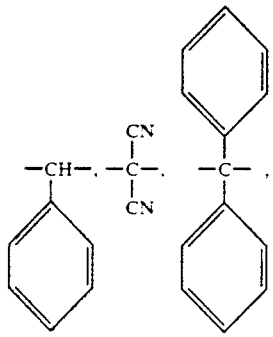

—SO$_2$—, —O—, or 13 S— wherein each R independently represents a hydrogen atom or a lower alkyl group having from 1 to 4 carbon atoms, and n is an integer of 1 or over.

The improved polyarylate resin, polyamide resin and epoxy resin used in the third embodiment of the invention are, respectively, those defined above.

The polyethylene terephthalate resin used in the third embodiment of the invention is one which is prepared, by any known technique, from terephthalic acid and/or its derivative and ethylene glycol.

The improved polyarylate resin, polyethylene terephthalate resin and polyamide resin are, respectively, used in amounts of not less than 10 wt %, from 3 to 60 wt %, and not less than 20 wt %, each based on the total amount of these three resins. If the amount of the improved polyarylate resin is less than 10 wt %, the heat resistance and impact strength of the resultant resin composition become low. If the amount of the polyamide resin is less than 20 wt %, the moldability and solvent resistance are lowered. If the amount of the polyethylene terephthalate resin is less than 3 wt %, the moldability and rigidity (modulus of elasticity) of the resultant composition are lowered. Over 60 wt %, the heat resistance and impact strength are lowered.

An increasing amount of the improved polyarylate resin component results in an increase in the impact strength and heat resistance of the resultant composition. When the polyamide component increases in amount, better moldability and solvent resistance are obtained. If the polyethylene terephthalate component increases in amount, the moldability becomes better with an increase in rigidity. A preferable composition capable of imparting well-balanced properties such as heat resistance, impact strength, moldability, rigidity and solvent resistance comprises from 15 to 45 wt % of the improved polyarylate resin, from 45 to 65 wt % of the polyamide resin, and from 7 to 35 wt % of the polyethylene terephthalate.

The amount of the epoxy resin is generally in the range of from 0.1 to 15 parts by weight per 100 parts by weight of the mixture of the improved polyarylate resin, polyamide resin and polyethylene terephthalate resin. If the amount is less than 0.1 part by weight, the impact strength is not improved satisfactorily. Over 15 parts by weight, the resultant composition lowers in heat resistance, and the melting temperature and viscosity increase, making it difficult to mold such a composition. A preferable amount is in the range of from 2 to 10 parts by weight.

For the production of the composition according to this embodiment, any technique of kneading the improved polyarylate resin, polyamide resin, polyethylene terephthalate resin and epoxy resin may be used without limitation. Favorable kneading and molding machines are those described with respect to the above described another resin composition of the invention.

The kneading order for obtaining the composition according to the third embodiment of the invention is not critical. For instance, the improved polyarylate, polyamide, polyethylene terephthalate and epoxy resin may be simultaneously kneaded. Alternatively, two or more of the four components may be first kneaded, to which the other components are subsequently added. The optimum kneading order is such that the improved polyarylate and polyethylene terephthalate are first melt kneaded, followed by melt kneading the mixture, polyamide and epoxy resins.

As a matter of course, any additives and fillers as described with reference to the above described another resin composition may be added to the resin composition of the third embodiment of the invention.

EXAMPLES

The invention is more particularly described by way of examples, which should not be construed as limiting the present invention thereto.

EXAMPLE 1

28.8 g (0.15 moles, 5.0 mole %) of polyethylene terephthalate, 398.3 g (1.28 moles, 42.5 mole %) of bisphenol A diacetate, 105.9 g (0.638 moles, 21.25 mole %) of terephthalic acid, 105.9 g (0.638 moles, 21.25 mole %) of isophthalic acid, 54.0 g (0.30 moles, 10 mole %) of p-acetoxybenzoic acid and 0.09 g of sodium acetate used as a catalyst were charged into a reactor equipped with a torque meter, an agitator provided with a revolution indicator, an argon introduction pipe, a thermometer and a distiller.

The air in the reactor was replaced satisfactorily by argon, after which the content was heated to 300° C. in 1 hour in a stream of argon while distilling off acetic acid.

The agitation was started when the starting materials on the way of the heating were fully molten.

After reaction at 300° C. for 30 minutes, the temperature was further raised and at the same time, the reaction system was reduced in pressure and was finally maintained at 340° C. under 0.5 mmHg, for which it took about 20 minutes. Under these temperature and pressure conditions, the reaction was continued for 35 minutes and the polymerization was stopped when the torque meter indicated 100 kg.cm/7 r.p.m.

The resultant product was injection molded and subjected to measurement of a degree of coloration and physical properties according to the methods described hereinafter. The results are shown in Table 1 and FIGS. 1 and 3.

EXAMPLES 2 to 6

The polymerization reaction was carried out in the same manner as in Example 1 except that the starting materials were used in amounts indicated in Table 1.

The resultant products were injection molded and subjected to measurement of a degree of coloration and physical properties with the results shown in Table 1 and FIGS. 1 and 3.

EXAMPLES 7 to 10

The polymerization reaction was carried out in the same manner as in Example 1 except that the starting materials indicated in Table 2 were used in amounts shown in Table 2.

Tests for physical properties were conducted according to the methods described hereinafter, with the results shown in Table 2.

EXAMPLES 11 and 12

The polymerization reaction was carried out in the same manner as in Example 1 using a final temperature for polymerization indicted in Table 3.

The tests for physical properties were conducted according to the methods described hereinafter, with the results shown in Table 3.

EXAMPLE 13

28.8 g (0.15 moles, 5 mole %) of polyethylene terephthalate, 291.1 g (1.28 moles, 42.5 mole %) of bisphenol A, 105.9 g (0.638 moles, 21.25 mole %) of terephthalic acid, 105.9 g (0.638 moles, 21.25 mole %) of isophthalic acid, 41.4 g (0.30 moles, 10 mole %) of p-hydroxybenzoic acid, 319.8 g (3.14 moles) of acetic anhydride and 0.09 g of sodium acetate used as a catalyst were charged into a reactor equipped with a torque meter, an agitator provided with a revolution indicator, an argon introduction pipe, a thermometer and a reflux condenser.

The air in the reactor was replaced satisfactorily by argon, after which the content was heated to 142° C. in 30 minutes in a stream of argon and refluxed at 142° C. for 2 hours. Thereafter, the reflux condenser was replaced by a distilling apparatus and the content was raised to 300° C. in 25 minutes while distilling off produced acetic acid. After reaction at 300° C. for 30 minutes, the temperature was further raised and at the same time, the reaction system was reduced in pressure and was finally maintained at 340° C. under 0.5 mmHg, for which it took about 20 minutes. Under these temperature and pressure conditions, the reaction was continued for 30 minutes and the polymerization was stopped when the torque meter indicated 100 kg.cm/7 r.p.m.

The resultant product was subjected to measurement of physical properties according to the methods described hereinafter. The results are shown in Table 3 and FIG. 5.

EXAMPLE 14

28.8 g (0.15 moles, 5 mole %) of polyethylene terephthalate, 291.1 g (1.28 moles, 42.5 mole %) of bisphenol A, 105.9 g (0.638 moles, 21.25 mole %) of terephthalic acid, 105.9 g (0.638 moles, 21.25 mole %) of isophthalic acid, 41.4 g (0.30 moles, 10 mole %) of p-hydroxybenzoic acid, 641.1 g (2.99 mole) of diphenyl carbonate and 0.09 g of sodium acetate used as a catalyst were charged into a reactor equipped with a torque meter, an agitator provided with a revolution indicator, an argon introduction pipe, a thermometer and a reflux condenser.

The air in the reactor was well replaced by argon, after which the content was heated to 280° C. in 1 hour in a stream of argon and refluxed at 280° C. Under reflux, carbon dioxide generated vigorously, which was stopped after 2.5 hours. After refluxing for 3 hours, the reflux condenser was replaced by a distilling apparatus, followed by raising to 300° C. in 10 minutes while removing produced phenol by distillation. After reaction at 300° C. for 30 minutes while distilling off the phenol, the reaction system was further heated and was simultaneously gradually reduced in pressure and finally maintained at 340° C. under 0.5 mmHg, for which it took about 20 minutes. Under these temperature and pressure conditions, the reaction was continued for 28 minutes and the polymerization was stopped when the torque meter indicated 100 kg.cm/7 r.p.m.

The resultant product was subjected to measurement of physical properties according to the methods described hereinafter. The results are shown in Table 3 and FIG. 5.

COMPARATIVE EXAMPLES 1 to 5

The polymerization reaction was carried out in the same manner as in Example 1 except that starting materials were used in amounts indicated in Table 1.

The resultant products were subjected to measurement of physical properties according to the methods described hereinafter. The results are shown in Table 1 and FIGS. 1 and 3.

COMPARATIVE EXAMPLES 6 and 7

The polymerization reaction was carried out in the same manner as in Example 1 except that the final temperature for the polymerization was that indicated in Table 3, thereby preparing resins with a low degree of polymerization.

The resultant products were subjected to measurement of physical properties according to the methods described hereinafter. The results are shown in Table 3 and FIG. 5.

EXAMPLE 15

28.8 g (0.15 moles, 5.0 mole %) of polyethylene terephthalate, 421.7 g (1.36 moles, 45.0 mole %) of bisphenol A diacetate, 112.1 g (0.676 moles, 22.5 mole %) of terephthalic acid, 112.1 g (0.676 moles, 22.5 mole %) of isophthalic acid, 27.0 g (0.15 moles, 5 mole %) of p-acetoxybenzoic acid, and 0.09 g of sodium acetate used as a catalyst were charged into a reactor equipped with a torque meter, an agitator provided with a revolution indicator, an argon introduction pipe, a thermometer and a distilling apparatus.

The air in the reactor was well replaced by argon, after which the content was heated to 300° C. in 1 hour in a stream of argon while distilling off acetic acid.

The agitation was started when the starting materials on the way of the heating were fully molten.

After reaction at 300° C. for 30 minutes, the reaction system was further heated and was simultaneously gradually reduced in pressure and finally maintained at 340° C. under 0.5 mmHg, for which it took about 20 minutes. Under these temperature and pressure conditions, the reaction was continued for 35 minutes and the polymerization was stopped when the torque meter indicated 100 kg.cm/7 r.p.m.

The resultant polymer was injection molded and the molding was subjected to measurement of physical properties according to the methods described hereinafter. The results are shown in Table 4 and FIG. 2.

EXAMPLES 16 to 21

The polymerization was carried out in the same manner as in Example 15 except that the respective starting materials were used in amounts indicated in Table 4 or 5. After injection molding, the resultant moldings were subjected to measurement of physical properties according to the methods described hereinafter. The results are shown in Table 4 or 5 and FIG. 2 or 4.

COMPARATIVE EXAMPLES 8 to 10, 13 and 14

The polymerization was carried out in the same manner as in Example 15 except that the respective starting materials were used in amounts indicated in Table 4 or 5. After injection molding, the resultant moldings were subjected to measurement of physical properties according to the methods described hereinafter. The results are shown in Table 4 or 5 and FIG. 2 or 4.

COMPARATIVE EXAMPLE 11

The polymerization was carried out in the same manner as in Example 15 except that the respective starting materials were used in amounts indicated in Table 4. 400 g of the resultant polymer (98 wt %) and 8.2 g (2 wt %) of hexabromobenzene were molten and kneaded in a 20 mm ∅ single-screw extruder available from Thermoplastic Inc., at a cylinder temperature of 340° C. After injection molding, the resultant molding were subjected to measurement of physical properties according to the methods described hereinafter. The results are shown in Table 4.

COMPARATIVE EXAMPLE 12

273.6 g (1 mole, 40 mole %) of bisphenol A, 163.1 g (0.3 moles, 10 mole %) of tetrabromobisphenol A, 124.5 g (0.75 moles, 25 mole %) of terephthalic acid, 124.5 g (0.75 moles, 25 mole %) of isophthalic acid, 319.8 g (3.14 moles) of acetic anhydride, and 0.09 g of sodium acetate used as a catalyst were charged into a reactor equipped with a torque meter, an agitator provided with a revolution indicator, an argon introduction pipe, a thermometer and a reflux condenser.

The air in the reactor was well replaced by argon, after which the content was heated to 142 ° C. in 30 minutes in a stream of argon, followed by refluxing at 142° C. for 2 hours. Thereafter, the reflux condenser was replaced by a distilling apparatus, followed by heating to 300° C. in 25 minutes while distilling off produced acetic acid. After reaction at 300° C. for 30 minutes, the reaction system was further heated and, at the same time, was reduced in pressure and maintained at 340° C. under 10 mmHg, for which it took about 20 minutes. Under these temperature and pressure conditions, the reaction was continued for 35 minutes and the polymerization was stopped when the torque meter indicated 100 kg.cm/7 r.p.m.

The resultant polymer was injection molded and the molding was subjected to measurement of physical properties according to the methods described hereinafter. The results are shown in Table 4.

Injection Molding and Methods For Measurement of Physical Properties:

(1) Injection molding

A test piece for the measurement of physical properties was made by the use of an injection molding machine of Model SAV-60-52, made by K. K. Yamashiro Seiki Seisakusho. The injection molding was effected at a mold temperature of 130° C. at an injection pressure of 1200 kg/cm$^2$ and the cylinder temperature was so set that a resin could be completely filled in the mold.

(2) Injection molding temperature

This temperature is a cylinder temperature at which the test piece is made. A lower injection molding temperature results in better moldability.

(3) Heat deformation temperature

Determined according to the method of ASTM D-648 wherein the load used was set at 18.6 kg/cm$^2$.

(4) Izod impact strength

Determined as notched according to the method of ASTM D-256.

(5) Tensile strength and modulus of elasticity in tension

Determined according to the method of ASTM D-638.

(6) Bending strength and modulus of elasticity in bending

Determined according to the method of ASTM D-790.

(7) Light transmittance

A direct-reading haze meter, made by K. K. Toyo Seiki Seisakusho, was used to measure a light transmittance of a 2 mm thick flat resin plate.

(8) Inherent viscosity

A mixed solvent of phenol/tetrachloroethane=60/40 (by weight) was used, in which a molding was dissolved at a concentration of 0.25 g/dl and the viscosity was measured at a temperature of 23° C. by the use of a capillary viscometer.

The inherent viscosity is defined according to the following equation $\eta = \ln(t/t_o)/C$ $\eta$: inherent viscosity (dl/g)

C: concentration (g/dl)

$t_o$: dropping time of the solvent alone (seconds)

t: dropping time of the resin solution (seconds)

(9) Flame retardancy test

A 1/16×½×5 inch test piece obtained by the injection molding was subjected to an UL-94 combustion test. The grades of UL-94, V-0, V-1 and V-2 are, respectively, defined as follows.

[94 V-0] After setting fire to a sample for 10 seconds, the flame is removed whereupon one firing and burning does not continue over 10 seconds, and the sample does not drop any burning particle capable of enkindling absorbent cotton located below 12 inches from the sample. The total firing time (ten fire settings) of five samples should not exceed 50 seconds.

[94V-1] After removal of a set flame, one firing and burning does not continue over 30 seconds, and the sample does not drop any burning particle capable of enkindling absorbent cotton located below 12 inches from the sample. The total firing time (ten fire settings) of five samples should not exceed 250 seconds.

[94V-2] After removal of a set flame, one firing and burning does not continue over 30 seconds. The sample drops some burning particles which scorch absorbent cotton located below 12 inches from the sample only within a short time but some of which set fire slightly.

The total firing time (ten fire settings) of five samples should not exceed 250 seconds.

(10) Dripping property

A $1/16 \times \kappa \times 5$ inch test piece was used and set fire for 25 seconds, whereupon burning and dropping of the resin was checked. The test was repeated ten times to determine the percentage of the number of dropping and firing absorbent cotton located below 12 inches therefrom and that of the number of dropping but not firing the absorbent cotton, based on the total of both numbers. A percent value nearer to 100% indicates more likelihood to dropping by combustion.

TABLE 1

| | Starting Composition* (mol %) | | | | Polymerization Time (Minutes) | Inherent Viscosity (dl/g) | Degree of Coloration (Degree of Yellowing) | Injection Molding Temperature (°C.) | Melting Temperature (°C.) | Heat Deformation Temperature (°C.) | Izod Impact Strength (kgcm/cm) | Tensile Strength (kg/mm²) | Modulus of Elasticity in Tension (kg/mm²) | Bending Strength (kg/mm²) | Modulus of Elasticity in Bending (kg/mm²) |
|---|---|---|---|---|---|---|---|---|---|---|---|---|---|---|---|
| | POB | BPA | TPA | IPA | PET | | | | | | | | | | | |
| Example 1 | 10 | 42.5 | 21.25 | 21.25 | 5 | 145 | 0.62 | light yellow (62) | 350 | 361 | 159 | 21.0 | 6.74 | 208.0 | 8.45 | 166.8 |
| Example 2 | 10 | 43.5 | 21.75 | 21.75 | 3 | 135 | 0.47 | light brown (112) | 356 | 367 | 162 | 15.3 | 6.78 | 209.3 | 8.59 | 163.7 |
| Example 3 | 10 | 41.75 | 20.88 | 20.88 | 6.5 | 150 | 0.58 | light yellow (78) | 340 | 352 | 158 | 23.2 | 6.91 | 211.0 | 8.63 | 172.3 |
| Example 4 | 10 | 40 | 20 | 20 | 10 | 182 | 0.56 | light yellow (101) | 332 | 341 | 154 | 12.6 | 6.84 | 213.3 | 9.32 | 186.2 |
| Example 5 | 10 | 32.5 | 16.25 | 16.25 | 25 | 198 | 0.55 | light brown (118) | 318 | 327 | 143 | 10.0 | 6.71 | 210.7 | 8.63 | 164.3 |
| Example 6 | 30 | 32.5 | 16.25 | 16.25 | 5 | 128 | 0.57 | light yellow (93) | 345 | 356 | 154 | 16.3 | 6.87 | 201.6 | 7.86 | 137.8 |
| Comparative Example 1 | 10 | 45 | 22.5 | 22.5 | — | 131 | 0.50 | blackis brown (179) | 397 | 408 | 166 | 8.5 | 6.88 | 198.4 | 8.71 | 165.7 |
| Comparative Example 2 | — | 47.5 | 23.75 | 23.75 | 5 | 210 | 0.47 | blackis brown (169) | 358 | 363 | 157 | 20.1 | 6.87 | 203.2 | 9.11 | 176.0 |
| Comparative Example 3 | 10 | 30 | 15 | 15 | 30 | 232 | 0.53 | blackis brown (182) | 314 | 321 | 109 | 1.3 | 2.31 | 206.2 | 3.05 | — |
| Comparative Example 4 | 60 | 17.5 | 8.75 | 8.75 | 5 | 125 | 0.32 | opaque yellow (49) | 315 | 327 | 135 | 1.4 | 2.11 | 225.0 | 3.51 | — |
| Comparative Example 5 | — | 50 | 25 | 25 | — | 136 | 0.54 | blackis Brown (163) | 376 | 387 | 167 | 11.4 | 6.81 | 205.9 | 8.74 | 171.0 |

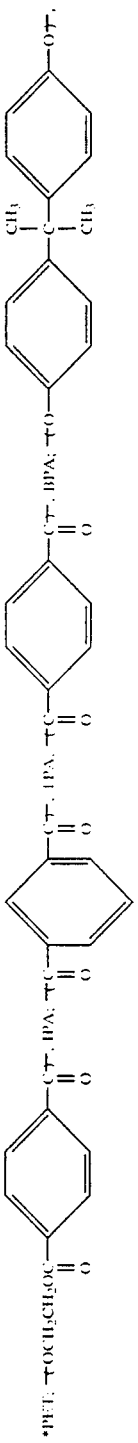

*PET: $\text{---OCH}_2\text{CH}_2\text{OC---}$, $\text{---T, IPA, TC---}$, $\text{---T, IPA, TC---}$, $\text{---T, IPA, TC---}$, $\text{---T, BPA, TO---}$

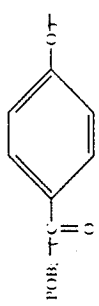

POB: $\text{---}\underset{\text{O}}{\text{C}}\text{---}$

TABLE 2

| | Starting Composition* (mol %) | | | | Polymerization Time (Minutes) | Inherent Viscosity (dl/g) | Degree of Coloration (Degree of Yellowing) | Physical Properties Injection Molding Temperature (°C.) | Melting Temperature (°C.) |
|---|---|---|---|---|---|---|---|---|---|
| Example 7 | (POB) 10 | (BPA) 42.5 | (TPA) 21.25 | (IPA) 21.25 | (PEN) 5 | 162 | 0.49 | right yellow (72) | 339 | 351 |
| Example 8 | (POB) 10 | (BPS) 42.5 | (TPA) 21.25 | (IPA) 21.25 | (PET) 5 | 168 | 0.47 | right brown (113) | 361 | 370 |
| Example 9 | (POB) 25 | (BPA) 32.5 | — | (NDC) 32.5 | (PET) 10 | 148 | 0.54 | right yellow (69) | 358 | 368 |
| Example 10 | (POB) 10 | (BPF) 42.5 | (TPA) 21.25 | (IPA) 21.25 | (PET) 5 | 152 | 0.52 | right yellow (74) | 346 | 357 |

| | Physical Properties | | | | | |
|---|---|---|---|---|---|---|
| | Heat Deformation Temperature (°C.) | Izod Impact Strength (kgcm/cm) | Tensile Strength (kg/mm²) | Modulus of Elasticity in Tension (kg/mm²) | Bending Strength (kg/mm²) | Modulus of Elasticity in Bending (kg/mm²) |
| Example 7 | 149 | 9.2 | 6.9 | 203.0 | 8.82 | 179.2 |
| Example 8 | 160 | 10.8 | 6.85 | 198.0 | 9.20 | 186.2 |
| Example 9 | 162 | 20.5 | 6.66 | 199.2 | 9.07 | 183.0 |
| Example 10 | 153 | 16.8 | 6.70 | 205.4 | 9.05 | 179.9 |

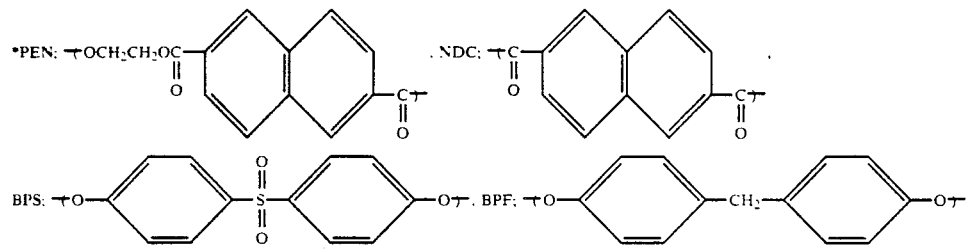

TABLE 3

| | Final Polymerization Temperature (°C.) | Polymerization Time (Minutes) | Inherent Viscosity (dl/g) | Degree of Coloration (Degree of Yellowing) | Physical Properties Injection Molding Temperature (°C.) |
|---|---|---|---|---|---|
| Example 11 | 320 | 128 | 0.53 | light yellow (39) | 344 |
| Example 12 | 330 | 138 | 0.54 | light yellow (48) | 347 |
| Example 13 | 340 | 260 (including refluxing time) | 0.62 | light yellow (78) | 351 |
| Example 14 | 340 | 358 (including refluxing time) | 0.59 | light yellow (70) | 349 |
| Example 1 | 340 | 145 | 0.62 | light yellow (62) | 350 |
| Comparative Example 6 | 280 | 105 | 0.38 | light yellow (25) | 284 |
| Comparative Example 7 | 300 | 115 | 0.43 | light yellow (36) | 311 |

| | Physical Properties | | | | | |
|---|---|---|---|---|---|---|
| | Melting Temperature (°C.) | Heat Deformation Temperature (°C.) | Izod Impact Strength (kgcm/cm) | Tensile Strength (kg/mm²) | Modulus of Elasticity in Tension (kg/mm²) | Bending Strength (kg/mm²) | Modulus of Elasticity in Bending (kg/mm²) |
| Example 11 | 356 | 151 | 3.4 | 6.85 | 211.6 | 9.09 | 183.7 |
| Example 12 | 356 | 149 | 5.6 | 6.79 | 191.0 | 9.32 | 191.0 |
| Example 13 | 362 | 156 | 15.5 | 6.75 | 209.3 | 8.61 | 168.8 |
| Example 14 | 361 | 157 | 16.1 | 6.74 | 198.0 | 8.39 | 164.7 |
| Example 1 | 361 | 159 | 21.0 | 6.74 | 208.0 | 8.45 | 166.8 |
| Comparative Example 6 | 301 | 131 | 1.3 | 1.50 | 188.8 | 7.00 | 193.0 |
| Comparative Example 7 | 323 | 141 | 1.4 | 1.60 | 187.0 | 8.70 | 213.0 |

TABLE 4

| | Comfustion Test | | | | |
|---|---|---|---|---|---|
| | First Firing | | Second Firing | | |
| | Comfustion | drops | Comfustion | drops | Dripping |

TABLE 4-continued

| | Composition (mol %) | | | | | Other | Time | by | Time | by | UL-94 | Property |
|---|---|---|---|---|---|---|---|---|---|---|---|---|
| | POB | BPA | TPA | IPA | PET | Component | (Seconds) | firing | (Seconds) | firing | Grade | (%) |
| Comparative Example | | | | | | | | | | | | |
| 8 | | 50 | 25 | 25 | | | 4.3 | 0 | 5.8 | 0 | V-1 | 100 |
| 9 | | 47.5 | 23.75 | 23.75 | 5 | | 7.4 | 2 | 1.5 | 2 | V-2 | 100 |
| Example | | | | | | | | | | | | |
| 15 | 5 | 45 | 22.5 | 22.5 | 5 | | 3.1 | 0 | 3.5 | 0 | V-0 | 20 |
| 16(1) | 10 | 42.5 | 21.25 | 21.25 | 5 | | 2.8 | 0 | 3.2 | 0 | V-0 | 20 |
| 17 | 30 | 32.5 | 16.25 | 16.25 | 5 | | 1.8 | 0 | 4.0 | 0 | V-0 | 10 |
| Comparative Example | | | | | | | | | | | | |
| 10 | 60 | 17.5 | 8.75 | 8.75 | 5 | | 2.0 | 0 | 3.1 | 0 | V-0 | 20 |
| 11 | | 50 | 25 | 25 | | Flame Retardant Hexabromobenzene (2 wt %) | 1.8 | 0 | 1.8 | 0 | V-0 | 70 |
| | | (98 wt %) | | | | | | | | | | |
| 12 | | 40 | 25 | 25 | | Compolymerized 10 mole % of Tetrabromobisphenol A | 1.8 | 0 | 2.8 | 0 | V-0 | 60 |

| | Physical Properties | | | | |
|---|---|---|---|---|---|
| | Izod Impact Strength (kgcm/cm) | Light Transmittance (%) | Heat Deformation Temperature (°C.) | Injection Molding Temperature (°C.) | Inherent Viscosity (dl/g) |
| Comparative Example | | | | | |
| 8 | 11.4 | 46.8 | 167 | 376 | 0.54 |
| 9 | 20.1 | 76.3 | 157 | 358 | 0.58 |
| Example | | | | | |
| 15 | 18.2 | 79.2 | 162 | 362 | 0.56 |
| 16(1) | 21.0 | 85.6 | 159 | 350 | 0.62 |
| 17 | 16.3 | 79.0 | 154 | 356 | 0.53 |
| Comparative Example | | | | | |
| 10 | 1.4 | 0 | 135 | 315 | 0.60 |
| 11 | 9.8 | 47.2 | 152 | 345 | 0.55 |
| 12 | 1.2 | 0 | 108 | 310 | 0.32 |

POB: $-C(=O)-C_6H_4-O-$, BPA: $-O-C_6H_4-C(CH_3)_2-C_6H_4-O-$, TPA: $-C(=O)-C_6H_4-C(=O)-$

IPA: $-C(=O)-C_6H_4-C(=O)-$ (meta), PET: $-OCH_2CH_2OC(=O)-C_6H_4-C(=O)-$

*The confustion time is an average of five measurements.
*The drops by firing mean the number of drops by five tests.
*The dripping property is a value by percent of the number of drops when a test of a firing time of 25 seconds was repeated ten times.

TABLE 5

| | Composition (mol %) | | | | | Confustion Test | | | | UL-94 | Dripping |
|---|---|---|---|---|---|---|---|---|---|---|---|
| | | | | | | First Firing | | Second Firing | | | |
| | POB | BPA | TPA | IPA | PET | Comfustion Time (Seconds) | drops by firing | Comfustion Time (Seconds) | drops by firing | Grade | Property (%) |
| Comparative Example 13(1) | 10 | 45.0 | 22.5 | 22.5 | — | 3.2 | 0 | 2.3 | 0 | V-0 | 0 |
| Example 18(2) | 10 | 43.5 | 21.75 | 21.75 | 3 | 2.9 | 0 | 1.9 | 0 | V-0 | 10 |
| Example 16(1) | 10 | 42.5 | 21.25 | 21.25 | 5 | 2.8 | 0 | 3.2 | 0 | V-0 | 20 |
| Example 19(3) | 10 | 41.75 | 20.88 | 20.88 | 6.5 | 3.6 | 0 | 3.2 | 0 | V-0 | 30 |
| Example 20(4) | 10 | 40 | 20 | 20 | 10 | 3.6 | 0 | 3.8 | 0 | V-0 | 30 |
| Example 21 | 3 | 38.5 | 19.25 | 19.25 | 20 | 5.3 | 0 | 6.2 | 0 | V-0 | 60 |
| Comparative Example 14 | 10 | 30 | 15 | 15 | 30 | 8.2 | 2 | 6.8 | 2 | V-0 | 80 |

| | Physical Properties | | | | |
|---|---|---|---|---|---|
| | Izod Impact Strength (kgcm/cm) | Light Transmittance (%) | Heat Deformation Temperature (°C.) | Injection Molding Temperature (°C.) | Inherent Viscosity (dl/g) |
| Comparative Example 13(1) | 8.5 | 76.2 | 166 | 397 | 0.50 |
| Example 18(2) | 15.3 | 70.8 | 162 | 356 | 0.47 |
| Example 16(1) | 21.0 | 85.6 | 159 | 350 | 0.62 |
| Example 19(3) | 23.2 | 72.1 | 158 | 340 | 0.58 |

TABLE 5-continued

| | | | | | |
|---|---|---|---|---|---|
| Example 20(4) | 12.6 | 75.3 | 154 | 332 | 0.56 |
| Example 21 | 15.6 | 58.9 | 132 | 310 | 0.52 |
| Comparative Example 14 | 1.3 | 40.1 | 109 | 314 | 0.53 |

From the above results, it will be seen that the polyarylate resins of the examples have all good mechanical strength, heat resistance, resistance to color change, transparency, moldability and flame retardancy, but the polyarylate resins of the comparative examples have, respectively, some drawbacks.

Those resins of Comparative Examples 1, 2, 3 and 5 suffer a considerable degree of coloration. In Comparative Example 3, the heat resistance deteriorates considerably. In Comparative Example 4, although the resistance to color change is good, the heat resistance and impact strength are very low and the resin is opaque, thus such a resin being not usable in practical applications.

In Comparative Examples 6 and 7, the starting composition is the same as that of Example 1 but the molecular weight is small, resulting in very low mechanical strength.

Comparative Examples 11 and 12 are provided for comparison with prior art compositions. In Comparative Example 11 where the flame retardant is used in an appropriate amount, the effect of shortening the combustion time is obtained but the dripping property is not improved satisfactorily coupled with a lowering of the impact strength. In Comparative Example 12 where a flame retardant monomer is copolymerized, the halogenated monomer is thermally decomposed during the stages of the polymerization and molding and the resultant polymer has not a satisfactory degree of polymerization. Accordingly, the strength lowers considerably and the resin is colored and is opaque (liver brown).

In order to prepare the polyarylate resins of the invention having well-balanced properties, the unit (I) should be used in an amount of from 3 to 30 mole % as is particularly shown in FIGS. 1 and 2 and the unit (IV) should be used in an amount of not larger than 25 mole % as is shown in FIGS. 3 and 4. As shown in FIG. 5, the inherent viscosity should be not less than 0.5 dl/g.

Next, starting materials used in the following examples and comparative examples are shown in Tables 6 to 8.

1. Polyarylate-based resins (PAR-1 to PAR-8)

TABLE 6

Improved polyarylate resins

| Abbreviation | $-\underset{\underset{O}{\|}}{C}-\!\!\bigcirc\!\!-O-$ | $-O-\!\!\bigcirc\!\!-\underset{\underset{CH_3}{\|}}{\overset{CH_3}{\|}}{C}-\!\!\bigcirc\!\!-O-$ | $-\underset{\underset{O}{\|}}{C}-\!\!\bigcirc\!\!-\underset{\underset{O}{\|}}{C}-$ |
|---|---|---|---|
| PAR-1 | 10 | 42.5 | 21.25 |
| PAR-2 | 30 | 32.5 | 16.25 |
| PAR-3 | 10 | 32.5 | 16.25 |

| Abbreviation | $-\underset{\underset{O}{\|}}{C}-\!\!\bigcirc\!\!\underset{C-}{}$ | $-O-CH_2CH_2-O-\underset{\underset{O}{\|}}{C}-\!\!\bigcirc\!\!-\underset{\underset{O}{\|}}{C}-$ |
|---|---|---|
| PAR-1 | 21.25 | 5 |
| PAR-2 | 16.25 | 5 |
| PAR-3 | 16.25 | 25 |

Note: the values are expressed by moles %.

TABLE 7

Polyarylate-based resins

| Abbr. | Mixtures of 80 parts by weight of PAR-1 and 20 parts by weight of: |
|---|---|
| PAR-4 | a polyphenylene sulfide resin (Riton, available from Philips Chem. Co., Ltd.) |
| PAR-5 | a polyether ether ketone (Victrex 450G, available from Sumitomo Chemical Industries, Limited) |
| PAR-6 | a polyether sulfone (Victrex 4100G, available from Sumitomo Chemical Industries Limited) |
| PAR-7 | a polysulfone (UDEL P-1700, available from Amoco Chemical Inc.) |
| PAR-8 | a wholly aromatic liquid crystalline polyester (Vectra A-950, available from Polyplastics Inc.) |

Note: each mixture was melt kneaded by the use of a twin-screw extruder at a cylinder temperature of 300 to 360°C.

2. Polyamide-based resins

PA-1: nylon 6 (Amilan CM1017, available from Toray Limited).

PA-2: nylon 6-6 (Amilan CM3001, available from Toray Limited).

PA-3: obtained by melt kneading 80 parts by weight of nylon 6 used as PA-1 and 20 parts by weight of ethylene-acrylate-maleic anhydride copolymer (Bondine LX4110, available from Sumika CDF Chem. Co., Ltd.) by the use of a twin-screw extruder at a cylinder temperature of 240° C.

3. Epoxy resins (CP-1 to CP-7)

CP-1 to CP-5: modified epoxy resins (available from Dainippon Ink and Chemicals, Inc.) shown in Table 8 having the following chemical structure.

TABLE 8

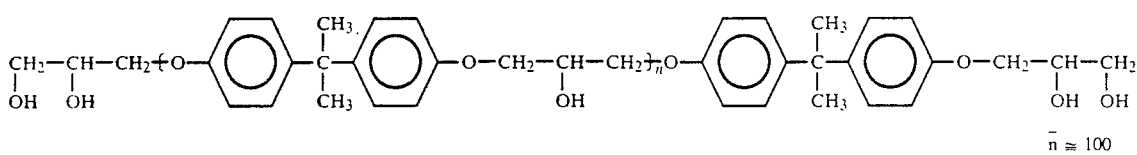

| Abbreviation | Commercial Name | Epoxy Equivalent | Approximate Number of n | Melting point (°C.) |
| --- | --- | --- | --- | --- |
| CP-1 | Epichlon 840 | 180 | $\bar{n} \cong 0$ | (liquid) |
| CP-2 | Epichlon 1050 | 450 | $\bar{n} \cong 2$ | 70 |
| CP-3 | Epichlon 4050 | 955 | $\bar{n} \cong 5-6$ | 102 |
| CP-4 | Epichlon 7050 | 1890 | $\bar{n} \cong 12$ | 130 |
| CP-5 | Epichlon 9055 | 2600 | $\bar{n} \cong 17$ | 152 |

CP-6: phenoxy resin (phenoxy PKHH, available from Union Carbide Co., Ltd.).

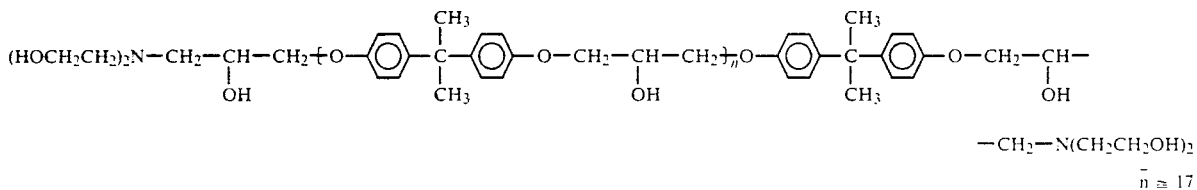

$\bar{n} \cong 100$

CP-7: Epichlon 9055 whose terminal epoxy groups were modified with diethanolamine.

$$(HOCH_2CH_2)_2N-CH_2-CH-CH_2+O-\bigcirc-\underset{\underset{CH_3}{|}}{\overset{\overset{CH_3}{|}}{C}}-\bigcirc-O-CH_2-CH-CH_2 \!+\! _nO-\bigcirc-\underset{\underset{CH_3}{|}}{\overset{\overset{CH_3}{|}}{C}}-\bigcirc-O-CH_2-CH-$$
$$\underset{OH}{} \qquad \underset{OH}{} \qquad \underset{OH}{}$$

$$-CH_2-N(CH_2CH_2OH)_2$$
$$\bar{n} \cong 17$$

4. Polyethylene terephthalate resin
(PET resin TR-4550BH, available from Teijin Co., Ltd.). The inherent viscosity is 0.70 dl/g.

EXAMPLES 22 to 27 and COMPARATIVE EXAMPLES 15 and 16

PAR-1 used as the polyarylate-based resin, PA-1 as the polyamide-based resin, and CP-5 as the third ingredient were mixed in different mixing ratios indicated in Table 9 and dried at 110° C. for 5 hours, followed by melt kneading and pelletizing in a twin-screw extruder at a cylinder temperature of 270° C. The resultant pellets of the respective mixtures were molded by means of an injection molding machine into $\frac{1}{2} \times 5 \times \frac{1}{2}$ inch elongated test pieces and dumbbell specimens for ASTM tensile test. The respective moldings were evaluated with respect to the physical properties. The results are shown in Table 9.

EXAMPLES 28 to 32 and COMPARATIVE EXAMPLES 17 and 18

PAR-1 used as the polyarylate-based resin, PA-1 as the polyamide-based resin, and CP-6 as the third ingredient were mixed at different mixing ratios indicated in Table 10. After drying at 110° C. for 5 hours, the mixtures were each melt kneaded and pelletized by means of a twin-screw extruder at an appropriate cylinder temperature ranging from 240° to 360° C. The resultant pellets were molded and checked for their physical properties in the same manner as in Example 22. The results are shown in Table 10.

EXAMPLES 33 to 35 and COMPARATIVE EXAMPLES 19 to 21

PAR-1 used as the polyarylate-based resin, PA-1 used as the polyamide-based resin and each of the third ingredients indicated in Table 11 were mixed at mixing ratios by weight of PAR-1/PA-1/third ingredient of 50/50/5, followed by kneading, molding and evaluation in the same manner as in Example 22. The results are shown in Table 11.

EXAMPLES 36 to 44

Each of the polyarylate-based resins and each of the polyamide-based resins, both indicated in Table 12, and CP-5 used as the third ingredient were mixed at mixing ratios by weight of polyarylate-based resin/polyamide-based resin/CP-5 of 50/50/5, followed by kneading, molding and evaluation in the same manner as in Example 22. The results are shown in Table 12.

EXAMPLES 45 to 50 and COMPARATIVE EXAMPLES 22 and 23

60 parts by weight of a polyarylate resin (PAR-1) and 40 parts by weight of a polyethylene terephthalate resin (PE-1) were mixed and dried at 110° C. for 5 hours. Thereafter, the mixture was melt kneaded and pelletized by means of a twin-screw extruder at a cylinder temperature of 300° C. 50 parts by weight of the mixture of the polyarylate resin and polyethylene terephthalate resin and 50 parts by weight of nylon 6 (PA-1) were mixed, to which an epoxy resin (CP-5) was added in different amount as indicated in Table 13 per 100 parts by weight of this mixture. After drying the respective mixtures at 110° C. for 5 hours, each mixture was melt kneaded and pelletized by means of a twin-screw extruder at a cylinder temperature of 270° C. The resultant pellets were molded by means of an injection molding machine into ½×1/5 ×⅛ inch elongated test pieces and dumbbell specimens for ASTM tensile test. The physical properties of the respective moldings were evaluated. The results are shown in Table 13.

From Table 13, it will be seen that the addition of small amounts of the epoxy resin results in a remarkable increase in the Izod impact strength and the tensile break energy. However, when the content of the epoxy resin exceeds 15 parts by weight, not only the impact strength and the heat distortion temperature are lowered, but also the moldability is worsened.

EXAMPLES 51 to 55 and COMPARATIVE EXAMPLES 24 to 29

A polyarylate resin (PAR-1), a polyethylene terephthalate resin (PE-1), nylon 6 (PA-1) and an epoxy resin (CP-5) were mixed in different mixing ratios indicated in Table 14, followed by pelletization in the same kneading order and manner as in Example 45, injection molding and evaluation of the physical properties. The results are shown in Table 14.

EXAMPLES 56 to 61 and COMPARATIVE EXAMPLES 30 to 34

Starting materials at different mixing ratios as indicated in Table 15 were pelletized in the same manner as in Example 45 wherein the polyarylate resin and polyethylene terephthalate resin were initially melt kneaded, to which the other two ingredients were added and melt kneaded for pelletization, followed by injection molding and evaluation of the physical properties. The results are shown in Table 15.

TABLE 9
Mixing ratio of epoxy resin and physical properties of the moldings.

| | Composition PAR-1/PA-1/CP-5 | Tensile Test Break strength (kg/mm²) | Modulus (kg/mm²) | Break energy (kg · cm) | Melt temp. of 10,000 poises (°C.) | Izod impact strength (kg · cm/cm) | Heat distortion temperature (°C.) |
|---|---|---|---|---|---|---|---|
| Comparative Example 15 | 50/50/0 | 4.15 | 210 | 232 | 269 | 1.5 | 162 |
| Example 22 | 50/50/1 | 6.07 | 217 | 720 | 300 | 4.2 | 161 |
| Example 23 | 50/50/3 | 6.42 | 221 | 1750 | 313 | 12.8 | 157 |
| Example 24 | 50/50/5 | 6.55 | 230 | 1760 | 321 | 11.9 | 155 |
| Example 25 | 50/50/7 | 6.59 | 228 | 1770 | 335 | 13.2 | 153 |
| Example 26 | 50/50/10 | 6.68 | 223 | 730 | 340 | 7.6 | 139 |
| Example 27 | 50/50/15 | 6.72 | 243 | 510 | 355 | 6.4 | 131 |
| Comparative Example 16 | 50/50/20 | 6.90 | 234 | 213 | 380 | 4.2 | 123 |

TABLE 10

| | Composition PAR-1/PA-1/CP-5 | Tensile Test Break strength (kg/mm²) | Modulus (kg/mm²) | Break energy (kg · cm) | Melt temp. of 10,000 poises (°C.) | Izod impact strength (kg · cm/cm) | Heat distortion temperature (°C.) |
|---|---|---|---|---|---|---|---|
| Comparative Example 17 | 0/100/5 | 6.29 | 238 | 650 | 237 | 4.3 | 71 |
| Example 28 | 20/80/5 | 6.32 | 232 | 800 | 293 | 6.3 | 132 |
| Example 29 | 40/60/5 | 6.61 | 229 | 1400 | 309 | 11.7 | 154 |
| Example 30 | 50/50/5 | 6.42 | 221 | 1700 | 319 | 12.3 | 157 |
| Example 31 | 60/40/5 | 6.21 | 215 | 1300 | 328 | 12.4 | 160 |
| Example 32 | 80/20/5 | 6.43 | 221 | 700 | 343 | 8.0 | 162 |
| Comparative Example 18 | 100/0/5 | 7.41 | 222 | 230 | 352 | 16.2 | 170 |

TABLE 11

| | Third ingredients | Tensile Test Break strength (kg/mm²) | Modulus (kg/mm²) | Break energy (kg · cm) | Melt temp. of 10,000 poises (°C.) | Izod impact strength (kg · cm/cm) | Heat distortion temperature (°C.) |
|---|---|---|---|---|---|---|---|
| Example 33 | CP-2 | 7.12 | 241 | 421 | 338 | 6.8 | 142 |
| Example 34 | CP-3 | 7.23 | 232 | 538 | 343 | 7.3 | 143 |
| Example 35 | CP-4 | 6.92 | 251 | 762 | 319 | 12.4 | 151 |
| Comparative Example 19 | CP-1 | (not moldable into dumbbell specimens) | | | >400 | 3.4 | 138 |
| Comparative Example 20 | CP-6 | 6.01 | 241 | 92 | 283 | 2.1 | 115 |
| Comparative Example 21 | CP-7 | 6.23 | 225 | 73 | 302 | 4.0 | 120 |

TABLE 12

| | Raw materials | | | Tensile Test | | | Melt temp. of 10,000 poises (°C.) | Izod impact strength (kg · cm/cm) | Heat distortion temperature (°C.) |
|---|---|---|---|---|---|---|---|---|---|
| | Polyarylate-based resin | Polyamide-based resin | Third ingredient | Break strength (kg/mm²) | Modulus (kg/mm²) | Break energy (kg · cm) | | | |
| Example 36 | PAR-2 | PA-1 | CP-5 | 6.03 | 229 | 560 | 331 | 6.9 | 141 |
| Example 37 | PAR-3 | PA-1 | CP-5 | 5.82 | 232 | 720 | 328 | 4.9 | 151 |
| Example 38 | PAR-4 | PA-1 | CP-5 | 6.72 | 223 | 1340 | 315 | 10.3 | 148 |
| Example 39 | PAR-5 | PA-1 | CP-5 | 6.38 | 216 | 2800 | 328 | 7.9 | 149 |
| Example 40 | PAR-6 | PA-1 | CP-5 | 6.45 | 223 | 730 | 319 | 16.3 | 153 |

TABLE 12-continued

|  | Raw materials | | | Tensile Test | | | Melt temp. of 10,000 poises (°C.) | Izod impact strength (kg · cm/cm) | Heat distortion temperature (°C.) |
| --- | --- | --- | --- | --- | --- | --- | --- | --- | --- |
|  | Polyarylate-based resin | Polyamide-based resin | Third ingredient | Break strength (kg/mm²) | Modulus (kg/mm²) | Break energy (kg · cm) | | | |
| Example 41 | PAR-7 | PA-1 | CP-5 | 6.29 | 231 | 1930 | 321 | 11.9 | 159 |
| Example 42 | PAR-8 | PA-1 | CP-5 | 6.38 | 229 | 1920 | 328 | 10.3 | 143 |
| Example 43 | PAR-1 | PA-2 | CP-5 | 5.97 | 225 | 1240 | 315 | 7.6 | 162 |
| Example 44 | PAR-1 | PA-3 | CP-5 | 6.20 | 167 | 980 | 391 | 7.2 | 149 |

TABLE 13

|  | Composition PAR-1/PE-1/PA-1/CP-5 | Tensile Test | | | Melt temp. of 10,000 poises (°C.) | Izod impact strength (kg · cm/cm) | Heat distortion temperature (°C.) |
| --- | --- | --- | --- | --- | --- | --- | --- |
|  |  | Yield strength (kg/mm²) | Modulus (kg/mm²) | Break energy (kg · cm) | | | |
| Comparative Example 22 | 30/20/50/0 | 4.80 | 242 | 30 | 273 | 2.5 | 118 |
| Example 45 | 30/20/50/1 | 5.32 | 241 | 732 | 266 | 3.5 | 122 |
| Example 46 | 30/20/50/3 | 7.24 | 251 | 1430 | 282 | 4.8 | 119 |
| Example 47 | 30/20/50/5 | 7.45 | 252 | 2630 | 293 | 7.9 | 113 |
| Example 48 | 30/20/50/7 | 7.38 | 253 | 1800 | 313 | 6.8 | 113 |
| Example 49 | 30/20/50/10 | 7.29 | 252 | 1510 | 331 | 5.2 | 105 |
| Example 50 | 30/20/50/15 | 7.36 | 257 | 1420 | 320 | 7.2 | 102 |
| Comparative Example 23 | 30/20/50/20 | 7.43 | 257 | 1290 | >400 | 3.1 | 93 |

TABLE 14

|  | Composition PAR-1/PE-1/PA-1/CP-5 | Tensile Test | | | Melt temp. of 10,000 poises (°C.) | Izod impact strength (kg · cm/cm) | Heat distortion temperature (°C.) |
| --- | --- | --- | --- | --- | --- | --- | --- |
|  |  | Yield strength (kg/mm²) | Modulus (kg/mm²) | Break energy (kg · cm) | | | |
| Comparative Example 24 | 0/50/50/5 | 6.45 | 255 | 393 | 280 | 2.3 | 90 |
| Comparative Example 25 | 5/45/50/5 | 6.12 | 249 | 98 | 303 | 2.9 | 87 |
| Comparative Example 26 | 9/41/50/5 | 5.85 | 245 | 72 | 304 | 3.8 | 101 |
| Example 51 | 15/35/50/5 | 6.50 | 244 | 930 | 313 | 7.3 | 109 |
| Example 52 | 25/25/50/5 | 7.10 | 238 | 2710 | 312 | 7.5 | 128 |
| Example 53 | 35/15/50/5 | 7.42 | 252 | 2380 | 321 | 5.3 | 133 |
| Example 54 | 40/10/50/5 | 7.37 | 239 | 2240 | 323 | 6.4 | 132 |
| Example 55 | 45/5/50/5 | 6.90 | 228 | 2100 | 321 | 9.3 | 143 |
| Comparative Example 27 | 50/0/50/5 | 6.63 | 234 | 1720 | 320 | 13.2 | 153 |
| Comparative Example 28 | 60/30/10/5 | 7.21 | 230 | 1038 | 372 | 15.1 | 142 |
| Comparative Example 29 | 15/70/15/5 | 5.33 | 223 | 79 | 238 | 2.8 | 86 |

TABLE 15

|  | Composition (ratios by weight) | Tensile Test | | | Melt temp. of 10,000 poises (°C.) | Izod impact strength (kg · cm/cm) | Heat distortion temperature (°C.) |
| --- | --- | --- | --- | --- | --- | --- | --- |
|  |  | Yield strength (kg/mm²) | Modulus (kg/mm²) | Break energy (kg · cm) | | | |
| Comparative Example 30 | PAR-1/PE-1/PA-1/CP-1 = 30/20/50/5 | not moldable into dumbbell specimens | | | >400 | 3.8 | 112 |
| Example 56 | PAR-1/PE-1/PA-1/CP-2 = 30/20/50/5 | 742 | 257 | 1870 | 345 | 6.7 | 123 |
| Example 57 | PAR-1/PE-1/PA-1/CP-3 = 30/20/50/5 | 743 | 253 | 1940 | 338 | 6.8 | 117 |
| Example 58 | PAR-1/PE-1/PA-1/CP-4 = 30/20/50/5 | 738 | 249 | 2040 | 320 | 7.1 | 117 |
| Comparative Example 31 | PAR-1/PE-1/PA-1/CP-6 = 30/20/50/5 | 728 | 254 | 59 | 270 | 4.7 | 109 |
| Comparative Example 32 | PAR-1/PE-1/PA-1/CP-7 = 30/20/50/5 | 706 | 238 | 79 | 270 | 3.5 | 107 |
| Example 59 | PAR-1/PE-1/PA-1/CP-5 = 30/20/50/5 | 729 | 263 | 820 | 317 | 6.8 | 128 |
| Comparative Example 33 | PAR-1/PE-1/PA-2 = 45/5/50 | 520 | 223 | 92 | 270 | 1.9 | 134 |
| Example 60 | PAR-1/PE-1/PA-2/CP-6 = 45/5/50/5 | 670 | 237 | 740 | 318 | 7.3 | 113 |
| Comparative Example 34 | PAR-1/PE-1/PA-2 = 45/5/50 | 420 | 199 | 48 | 262 | 3.1 | 139 |

TABLE 15-continued

| Composition (ratios by weight) | Tensile Test | | | Melt temp. of 10,000 poises (°C.) | Izod impact strength (kg · cm/cm) | Heat distortion temperature (°C.) |
| --- | --- | --- | --- | --- | --- | --- |
| | Yield strength (kg/mm²) | Modulus (kg/mm²) | Break energy (kg · cm) | | | |
| Example 61 PAR-1/PE-1/PA-2/CP-6 = 45/5/50/5 | 570 | 194 | 670 | 309 | 9.2 | 121 |

PAR-1: polyarylate resin
PE-1: polyethylene terephthalate resin
PA-1 and PA-2: polyamide resins
CP-1 to CP-4: epoxy resins
CP-6: phenoxy resin
CP-7: modified epoxy resin According to the invention, polyarylate resins having good mechanical strength, resistances to heat and color change, transparency, moldability and flame retardancy can be obtained by ordinary melt polymerization.

The polyarylate resins of the invention have practical merits and can be industrially produced inexpensively. Because of its transparency, the polyarylate resin of the invention is applicable to optical fields such as lenses, illuminators and the like, and is also applicable to automobile parts and various electric and electronic parts in view of its good heat resistance and mechanical strength.

Second embodiment of the present invention provides an improved resin composition having balanced physical properties which comprise improved moldability, heat resistance, impact resistance and solvent resistance and high rigidity.

Because of these characteristics, the resin composition according to the embodiment finds most suitable use in such applications as a thermosetting plastic paint for use in automobile shell plate and a housing for use in electronic and electric devices, equipments and the like which are exposed to high temperatures.

Third embodiment of the present invention provides another improved resin composition having balanced physical properties which comprise improved moldability, heat resistance, impact resistance and solvent resistance and high rigidity.

Because of these characteristics, the resin composition according to the embodiment finds most suitable use in such applications as a housing for use in electronic and electric devices, equipments and the like which are exposed to high temperatures, switches, knobs and various vessels and daily necessaries applying the high solvent resistance of said resin composition.

What is claimed is:

1. An improved polyarylate which comprise the following units (I) to (IV)

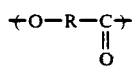  (I)

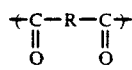  (II)

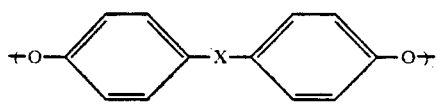  (III)

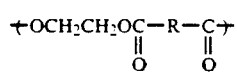  (IV)

wherein each R in the units (I), (II) and (IV) independently represents a paraphenylene group, a metaphenylene group, a 4,4'-biphenylene group or a 2,6-naphthalene group, and X represents $$-\overset{\underset{|}{CH_3}}{\underset{|}{C}}- , \quad -CH_2-, \quad -SO_2-, \quad -\overset{|}{\underset{CH_3}{CH}}-,$$

$$-\overset{\underset{|}{CH_3}}{\underset{|}{C_2H_5}}- , \quad -\overset{|}{\underset{C_2H_7}{CH}}-,$$

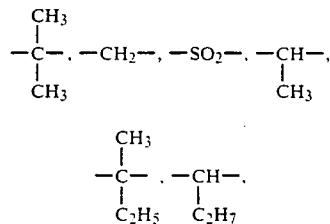

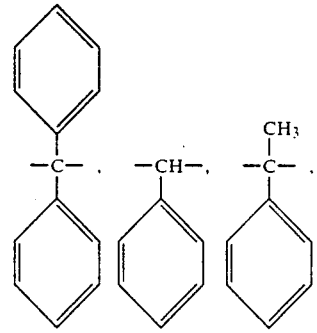

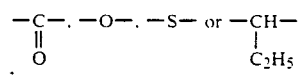

provided that any hydrogen atom directly joined to the aromatic ring of each of the units (I) to (IV) is unsubstituted or is substituted with an alkyl group having from 1 to 6 carbon atoms or an alkoxy group having from 1 to 6 carbon atoms and the units (I) to (IV) have one or more R, and X or more than one X respectively, the units (I) being contained in an amount of from 3 to 30 mole %, the units (II) being contained in an amount of not less than 30 mole %, the units (III) being contained in an amount of not less than 30 mole %, and the units (IV) being contained in an amount of not larger than 25 mole %, each based on the total moles of the units (I) to (IV).

2. An improved polyarylate resin according to claim 1, wherein said polyarylate resin has an inherent viscosity of not less than 0.50 dl/g when measured at a concentration of 0.25 g/dl at a temperature of 23° C. in a solvent of phenol and tetrachloroethane at a mixing ratio by weight of 60/40.

3. An improved polyarylate resin according to claim 1, wherein the content of the unit (IV) for the polyarylate resin is from 2 to 25 mole % of the total moles of the units (I) to (IV).

4. A thermoplastic resin composition which comprises 100 parts by weight of a mixture comprising from 10 to 90 wt % of a polyarylate-based resin containing not less than 70 wt % of said improved polyarylate resin of claim 1, from 90 to 10 wt % of a polyamide-based resin containing not less than 70 wt % of a polyamide resin component, and from 0.1 to 15 parts by weight of an epoxy resin of the following formula

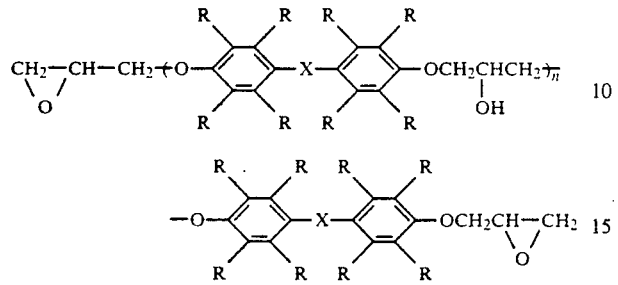

wherein X represents a direct bond or X is a lower alkylene group having from 1 to 4 carbon atoms,

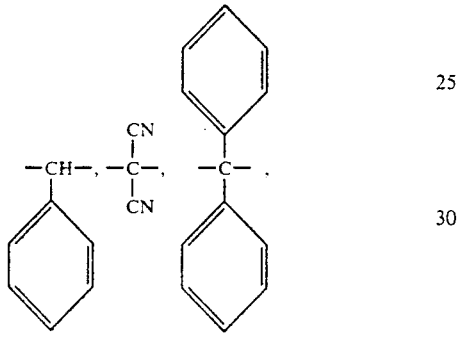

—SO₂—, —O— or —S— wherein each R independently represents a hydrogen atom or a lower alkyl group having from 1 to 4 carbon atoms, and n is an integer of 1 or over.

5. A thermoplastic resin composition according to claim 4, wherein the amount of said polyarylate-based resin is from 30 to 60 wt % and the amount of said polyamide-based resin is, correspondingly, from 70 to 40 wt %, and the amount of said epoxy resin is from 2 to 10 parts by weight per 100 parts by weight of the total of said polyarylate-based resin and said polyamide-based resin.

6. A thermoplastic resin composition which comprises 100 parts by weight of a mixture comprising not less than 10 wt % of said improved polyarylate resin of claim 1, not less than 20 wt % of a polyamide resin and from 3 to 60 wt % of a polyethylene terephthalate resin, and from 0.1 to 15 parts by weight of an epoxy resin of the following formula.

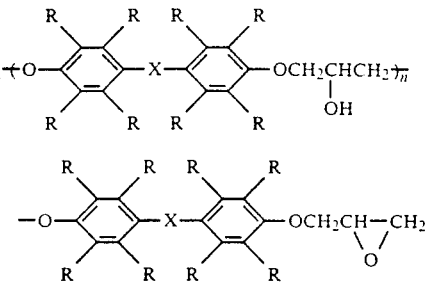

wherein X represents a direct bond or X is a lower alkylene group having from 1 to 4 carbon atoms,

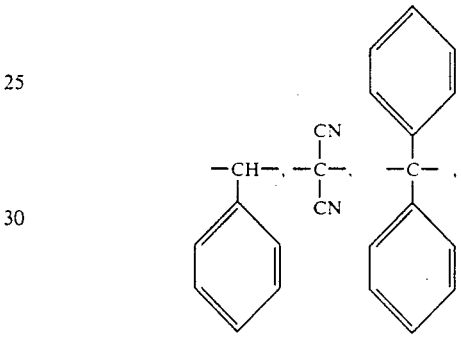

—SO₂—, —O—, or —S— wherein each R independently represents a hydrogen atom, a lower alkyl group having from 1 to 4 carbon atoms, and n is an integer of 1 or more.

7. A thermoplastic resin composition according to claim 6, wherein the amount of said polyarylate resin is from 15 to 45 wt %, the amount of said polyamide resin is from 45 to 65 wt % and the amount of said polyethylene terephthalate resin is from 7 to 35 wt % and said epoxy resin is from 2 to 10 parts by weight per 100 parts by weight of the total of said polyarylate resin, said polyamide resin and said polyethylene terephthalate resin.

* * * * *